United States Patent
Przybylski et al.

(10) Patent No.: US 11,243,503 B2
(45) Date of Patent: Feb. 8, 2022

(54) BUILDING MANAGEMENT SYSTEM WITH ONLINE CONFIGURABLE SYSTEM IDENTIFICATION

(71) Applicant: Johnson Controls Technology Company, Auburn Hills, MI (US)

(72) Inventors: Andrew J. Przybylski, Franksville, WI (US); Michael J. Wenzel, Grafton, WI (US); Matthew J. Ellis, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 20 days.

(21) Appl. No.: 16/040,698

(22) Filed: Jul. 20, 2018

(65) Prior Publication Data
US 2020/0026249 A1   Jan. 23, 2020

(51) Int. Cl.
*G05B 13/04* (2006.01)
*F24F 11/49* (2018.01)
(Continued)

(52) U.S. Cl.
CPC .......... *G05B 13/048* (2013.01); *F24F 11/49* (2018.01); *G05B 13/0265* (2013.01); *G06F 3/04847* (2013.01)

(58) Field of Classification Search
CPC .............. G05B 13/048; G05B 13/0265; G05B 19/042; G05B 15/02; G05B 23/0208;
(Continued)

(56) References Cited

U.S. PATENT DOCUMENTS 6,236,956 B1 * 5/2001 Mantooth ................. G06F 8/34
703/14
6,697,788 B1 * 2/2004 Fukuda .................... G06F 17/11
382/250

(Continued)

FOREIGN PATENT DOCUMENTS

CN       102812303 A    12/2012
CN       103246212      8/2013
(Continued)

OTHER PUBLICATIONS

U.S. Appl. No. 15/900,459, filed Feb. 20, 2018, Johnson Controls Technology Company.
(Continued)

*Primary Examiner* — Santosh R Poudel
(74) *Attorney, Agent, or Firm* — Foley & Lardner LLP

(57) ABSTRACT

A building management system includes building equipment operable to affect a variable state or condition of a building and a control system configured to receive a user input indicating a model form. The model form includes a plurality of matrices having a plurality of elements defined in terms of a plurality of parameters. The control system is configured to parse the model form to generate a sequence of machine-executable steps for determining a value of each of the plurality of elements based on a set of potential parameter values, identify a system model by executing the sequence of machine-executable steps to generate a set of parameter values for the plurality of parameters, generate a graphical user interface that illustrates a fit between predictions of the identified system model and behavior of the variable state or condition of the building, and control the building equipment using the identified system model.

17 Claims, 12 Drawing Sheets

(51) Int. Cl.
*G05B 13/02* (2006.01)
*G06F 3/0484* (2013.01)

(58) Field of Classification Search
CPC .. F24F 11/49; F24F 11/63; F24F 11/50; F24F 3/00; F24F 5/0017; G06F 3/04847
See application file for complete search history.

(56) References Cited

U.S. PATENT DOCUMENTS

| | | | |
|---|---|---|---|
| 8,903,554 | B2 | 12/2014 | Stagner |
| 9,026,266 | B2 | 5/2015 | Francis et al. |
| 9,429,923 | B2 | 8/2016 | Ward et al. |
| 9,798,336 | B2 | 10/2017 | Przybylski |
| 2011/0087988 | A1 | 4/2011 | Ray et al. |
| 2011/0161059 | A1* | 6/2011 | Jain ................ G05B 17/02 703/2 |
| 2013/0055145 | A1 | 2/2013 | Antony et al. |
| 2013/0249410 | A1* | 9/2013 | Thompson ........ H05B 37/0227 315/158 |
| 2014/0128997 | A1* | 5/2014 | Holub ............. G05B 13/048 700/30 |
| 2016/0026162 | A1* | 1/2016 | Snyder ............. G05B 11/42 700/86 |
| 2016/0146495 | A1 | 5/2016 | Malve et al. |
| 2016/0195866 | A1 | 7/2016 | Turney et al. |
| 2016/0327295 | A1 | 11/2016 | Ward et al. |
| 2016/0377306 | A1 | 12/2016 | Drees et al. |
| 2017/0102162 | A1 | 4/2017 | Drees et al. |
| 2017/0103483 | A1 | 4/2017 | Drees et al. |
| 2017/0132817 | A1* | 5/2017 | Mahajan ............. G06N 3/105 |
| 2017/0159962 | A1 | 6/2017 | Walser et al. |
| 2017/0343969 | A1* | 11/2017 | Dykstra ............. E21B 44/00 |
| 2018/0088547 | A1 | 3/2018 | Perez |
| 2018/0137858 | A1* | 5/2018 | Saxena ............. G10L 15/22 |
| 2019/0024495 | A1* | 1/2019 | Wise ............... E21B 41/0092 |
| 2019/0163147 | A1* | 5/2019 | D'Amato ........... G05B 17/02 |

FOREIGN PATENT DOCUMENTS

| | | |
|---|---|---|
| CN | 104180480 | 12/2014 |
| CN | 105042800 A | 11/2015 |
| CN | 105378391 | 3/2016 |
| CN | 106021813 | 10/2016 |
| CN | 106066077 | 11/2016 |
| CN | 107111286 | 8/2017 |
| CN | 107143981 A | 9/2017 |
| CN | 107272603 | 10/2017 |
| CN | 107420959 A | 12/2017 |
| CN | 107430388 | 12/2017 |
| CN | 107735735 | 2/2018 |
| CN | 107940667 | 4/2018 |
| CN | 108241295 | 7/2018 |
| JP | 2016-121107 S | 8/2016 |
| JP | 2017-217131 S | 12/2017 |
| JP | 2018-050290 A | 3/2018 |
| JP | 2017-134847 S | 4/2018 |
| WO | WO-2015/074729 | 5/2015 |
| WO | WO-2015/074791 A1 | 5/2015 |

OTHER PUBLICATIONS

U.S. Appl. No. 15/953,324, filed Apr. 13, 2018, Johnson Controls Technology Company.
U.S. Appl. No. 15/963,891, filed Apr. 26, 2018, Johnson Controls Technology Company.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsei, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor, System Identification: Theory for the user (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Ferrarini et al., Modeling and control of thermal energy of a large commercial building.2013 IEEE International Workshop on Inteligent Energy Systems (IWIES), IEEE, Nov. 14, 2013. pp. 149-154.
Search Report on EP 19186473.5 dated Nov. 22, 2019. 9 pages.
Office Action on JP 2019-111684, dated Jul. 14, 2020, 8 pages with English translation.
Office Action on CN 201910613912.9, dated Nov. 18, 2020, 14 pages.
Atam et al., "Control-Oriented Thermal Modeling of Multizone Buildings: Methods and Issues: Intelligent Control of a Building System," IEEE Control Systems, IEEE, USA, vol. 36, No. 3, Jun. 2016, pp. 86-111.
Office Action on EP 19186473.5, dated May 20, 2021, 6 pages.
Office Action on CN 201910613912.9, dated Jul. 13, 2021, 8 pages.
CN Notice of Allowance with Search Report on CN Appl. Ser. No. 201910613912.9 dated Nov. 23, 2021 (12 pages).

* cited by examiner

BUILDING MANAGEMENT SYSTEM WITH ONLINE CONFIGURABLE SYSTEM IDENTIFICATION

BACKGROUND

The present disclosure relates generally building equipment, and more particularly to system identification for use in controlling building equipment.

System identification refers to the determination of the model of the system (here, a building served by building equipment) that can be used to control the building equipment, for example based on a model predictive control algorithm. Because the physical phenomena that govern such systems are often complex, nonlinear, and poorly understood, system identification requires the determination of model parameters based on measured and recorded data from the real system in order to generate an accurate predictive model. Further, the model form (i.e., the relationship between input and output vectors defined by the arrangement of parameters in system matrices) itself may be unknown, requiring some amount of estimation or guessing to find an model form for which parameters may be identified to create an accurate predictive model.

In conventional approaches, the model form is typically hard-coded into a software package for identifying the values of model parameters in system identification. However, in many cases the model form is not sufficiently representative of the physical system to result in accurate system identification. Thus, when system identification fails to reach a sufficiently accurate model in the typical approach, a technician tasked with system identification is required to open the source code, derive new operations representative of a new model form, rewrite software code to program the software to follow the new operations, and recompile the code for installation and use. The technician may be forced to repeat these reprogramming steps multiple times until a sufficiently accurate model form is identified. Systems and methods for system identification that facilitate alterations to the model form without the need to repeatedly rewrite and recompile code may save substantial time in system identification, reduce the qualifications necessary for technicians tasked with system identification, and otherwise reduce the costs and challenges associated with system identification.

SUMMARY

One embodiment of the present disclosure relates to a building management system. The building management system includes building equipment operable to affect a variable state or condition of a building and a control system. The control system is configured to receive a user input indicating a model form. The model form includes a plurality of matrices having a plurality of elements. One or more of the plurality of elements are defined in terms of a plurality of parameters. The control system is also configured to parse the model form to generate a sequence of machine-executable steps for determining a value of each of the plurality of elements based on a set of potential parameter values, identify a system model by executing the sequence of machine-executable steps to generate a set of parameter values for the plurality of parameters, generate a graphical user interface that illustrates a fit between predictions of the identified system model and behavior of the variable state or condition of the building, and control the building equipment using the identified system model.

In some embodiments, the control system is configured to identify a system model by executing the sequence of machine-executable steps to generate the set of parameter values for the plurality of parameters by calculating a cost function value for each a plurality of sets of potential parameter values using the sequence of machine-executable steps. The cost function value is calculated based on training data relating to the building equipment. The control system is further configured to define the set of parameter values by selecting the set of potential parameter values corresponding to a lowest cost function value and generate the system model by calculating the value of each of the plurality of elements using the set of parameter values and the sequence of machine-executable steps.

In some embodiments, the graphical user interface is configured to allow a user to select a cost function from a group of possible cost functions. The control circuit is configured to calculate the cost function value calculated using the cost function. In some embodiments, the graphical user interface is configured to allow a user to enter a preference relating to the training data. The control circuit is configured to modify the training data based on the preference.

In some embodiments, the graphical user interface is configured to allow a user to edit the model form to create an edited model form. The control system is configured to update the system model based on the edited model form.

In some embodiments, the user input indicating the model form includes a plurality of entries in a plurality of element entry fields. Each element entry field corresponds to one of the plurality of elements. The user input also includes an indication of one or more of a number of inputs, a number of outputs, or a number of states of the model form.

In some embodiments, the control system is configured to control the building equipment using the identified system model by generating a control signal for the building equipment by applying the identified system model in a model predictive control approach.

In some embodiments, the graphical user interface illustrates the fit between predictions of the identified system model and behavior of the variable state or condition of the building by providing a plot of average prediction errors for a plurality steps into a future, a plot of weighted averages of prediction errors within a prediction horizon for each point of a training set, or a plot of the predictions of the system model overlaid on a plot of the behavior of the variable state or condition of the building.

In some embodiments, the building equipment includes one or more of HVAC equipment, a variable refrigerant flow system, or an energy storage system.

Another implementation of the present disclosure is a method for controlling building equipment in a building management system. The method includes operating building equipment to affect a variable state or condition of the building, and receiving, by a control system, a user input indicating a model form. The model form includes a plurality of matrices having a plurality of elements. One or more of the plurality of elements are defined in terms of a plurality of parameters. The method also includes parsing, by the control system, the model form to generate a sequence of machine-executable steps for determining a value of each of the plurality of elements based on a set of potential parameter values, identifying a system model by executing the sequence of machine-executable steps to generate a set of parameter values for the plurality of parameters, generating a graphical user interface that illustrates a fit between predictions of the identified system model and behavior of the variable state or condition of the building, and controlling the building equipment using the identified system model.

In some embodiments, identifying a system model by executing the sequence of machine-executable steps to generate a set of parameter values for the plurality of parameters includes calculating a cost function value for each a plurality of sets of potential parameter values using the sequence of machine-executable steps. The cost-function value is calculated based on training data relating to the building equipment. The method also includes defining the set of parameter values by selecting the set of potential parameter values corresponding to a lowest cost function value and generating the system model by calculating the value of each of the plurality of elements using the set of parameter values and the sequence of machine-executable steps.

In some embodiments, the graphical user interface allows a user to select a cost function from a group of possible cost functions. The cost function value is calculated based on the cost function. In some embodiments, the graphical interface allows a user to enter a preference relating to the training data. The method includes modifying the training data based on the preference.

In some embodiments, the graphical user interface allows a user to edit the model form to create an edited model form. The method includes updating, by the control system, the identified system model based on the edited model form.

In some embodiments, controlling the building equipment using the identified system model includes generating a control signal for the building equipment by applying the identified system model in a model predictive control approach.

In some embodiments, the graphical user interface illustrates the fit between predictions of the identified system model and behavior of the variable state or condition of the building by providing a plot of average prediction errors for a plurality steps into a future, a plot of weighted averages of prediction errors within a prediction horizon for each point of a training set, or a plot of the predictions of the system model overlaid on a plot of the behavior of the variable state or condition of the building.

In some embodiments, the building equipment includes one or more of HVAC equipment, a variable refrigerant flow system, or an energy storage system.

Another implementation of the present disclosure is a building management system. The building management system includes building equipment operable to affect a variable state or condition of a building and a control system configured to generate a graphical user interface. The graphical user interface includes one or more dimension entry fields that allow a user to specify one or more of a number of inputs, a number of outputs, or a number of states of a model form, a matrix definition widget that allows a user to define each of a plurality of elements of a first matrix of the model form in terms of one or more of one or more constant values, one or more mathematical operations, or one or more parameters, and a matrices list that allows a user to navigate to views of each of a plurality additional matrices of the model form in the matrix definition widget. Each view allows a user to define elements of one of the additional matrices. The graphical user interface also includes a fit button. The fit button is selectable by a user to instruct the control system to determine values for the one or more parameters based on the model form and a set of training data relating to the building to identify a system model, and provide, on the graphical user interface, a graphical representation of a fit between predictions made using the system model and measured behavior of the variable state or condition of the building. The control system is configured to control the building equipment based on the system model.

In some embodiments, the graphical user interface includes an algorithm options widget that allows a user to select a cost function for use by the control system in determining values for the one or more parameters.

DETAILED DESCRIPTION

Referring generally to the FIGURES, systems and methods for online configurable system identification are shown, according to exemplary embodiments. As detailed below, the systems and methods described herein allow a user to input and edit a model form for a state-space model of a building system in an intuitive graphical user interface, instruct a control system to determine optimal values of parameters to identify a model of the building system based on that model form, and view a graphical representation of how well predictions made using the system model fit the actual behavior of the building system. The system model may then be directly applied in a model predictive controller to control building equipment based on the system model without the need for a technician to edit source code. The systems and methods described herein may thereby save substantial time in system identification and reduce the qualifications necessary for technicians tasked with system identification. Costs and inefficiencies associated with system identification may thereby be substantially reduced, facilitating easy installation and efficient edits and updates to the system model.

Building Equipment

Figure 1:
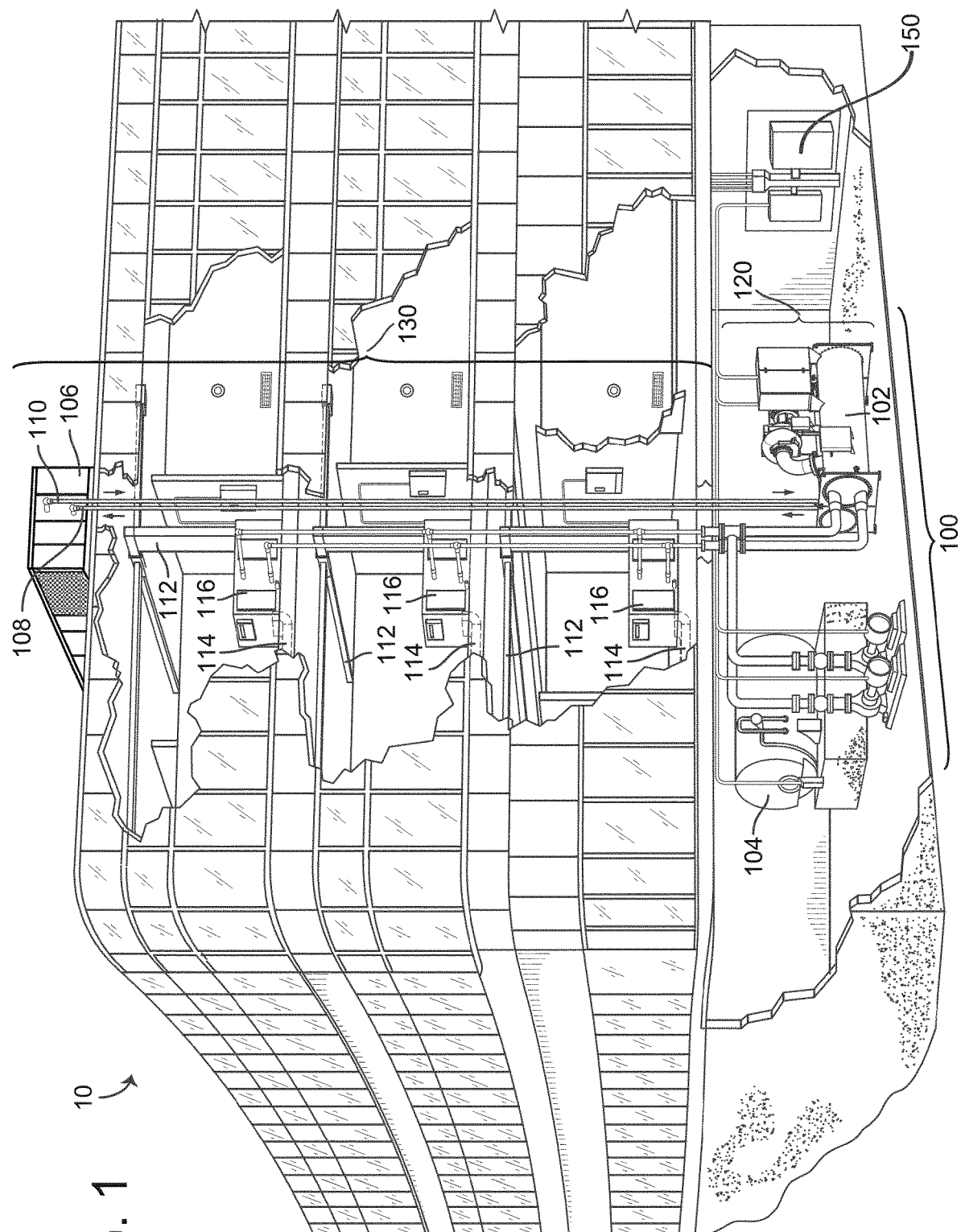
FIG. 1 is a drawing of a building equipped with an HVAC system, according to an exemplary embodiment.
Figure 2:
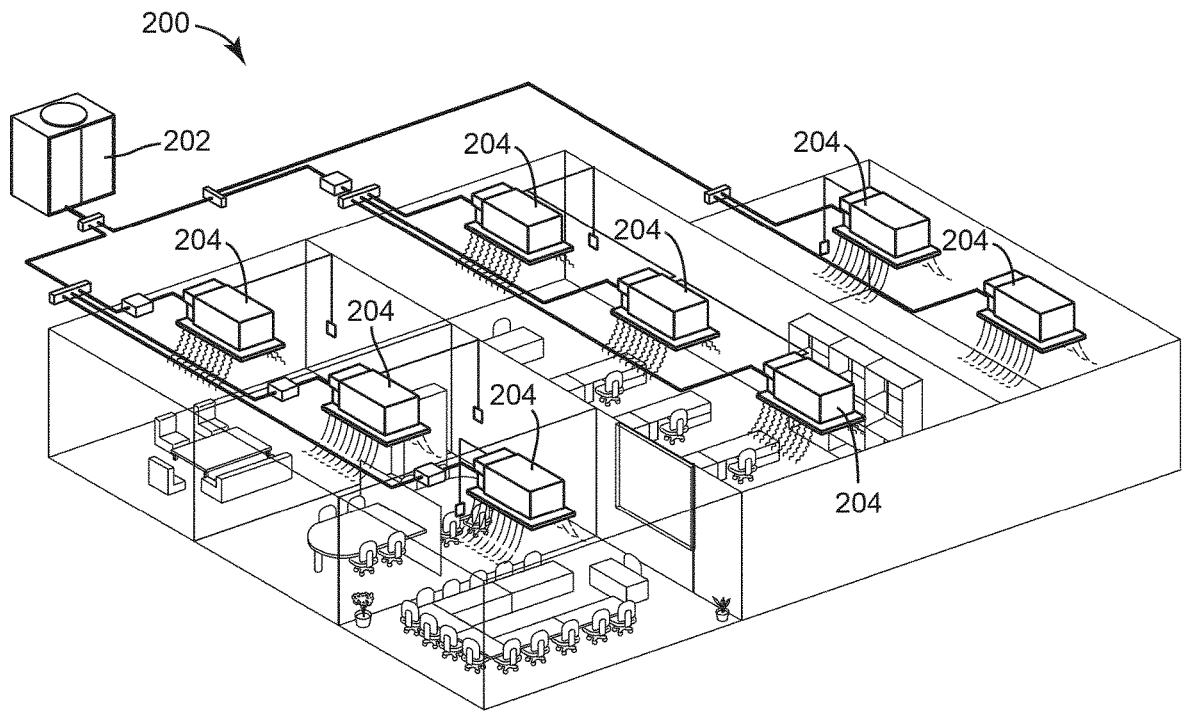
FIG. 2 is a first illustration of a variable refrigerant flow system, according to an exemplary embodiment.
Figure 3:
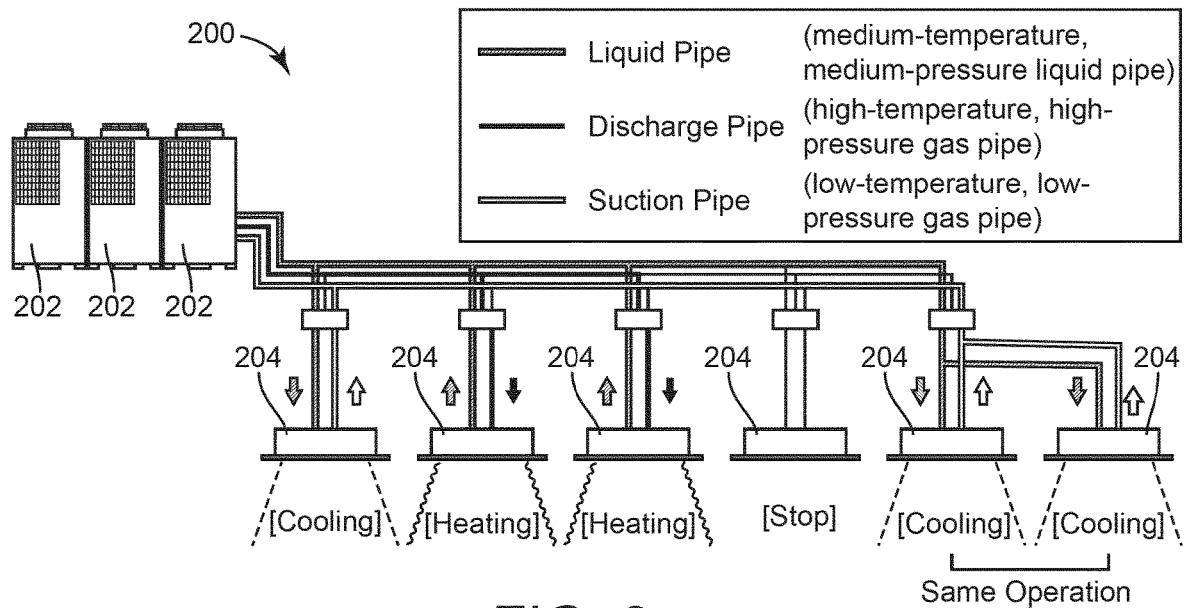
FIG. 3 is a second illustration of a variable refrigerant flow system, according to an exemplary embodiment.
Figure 4:
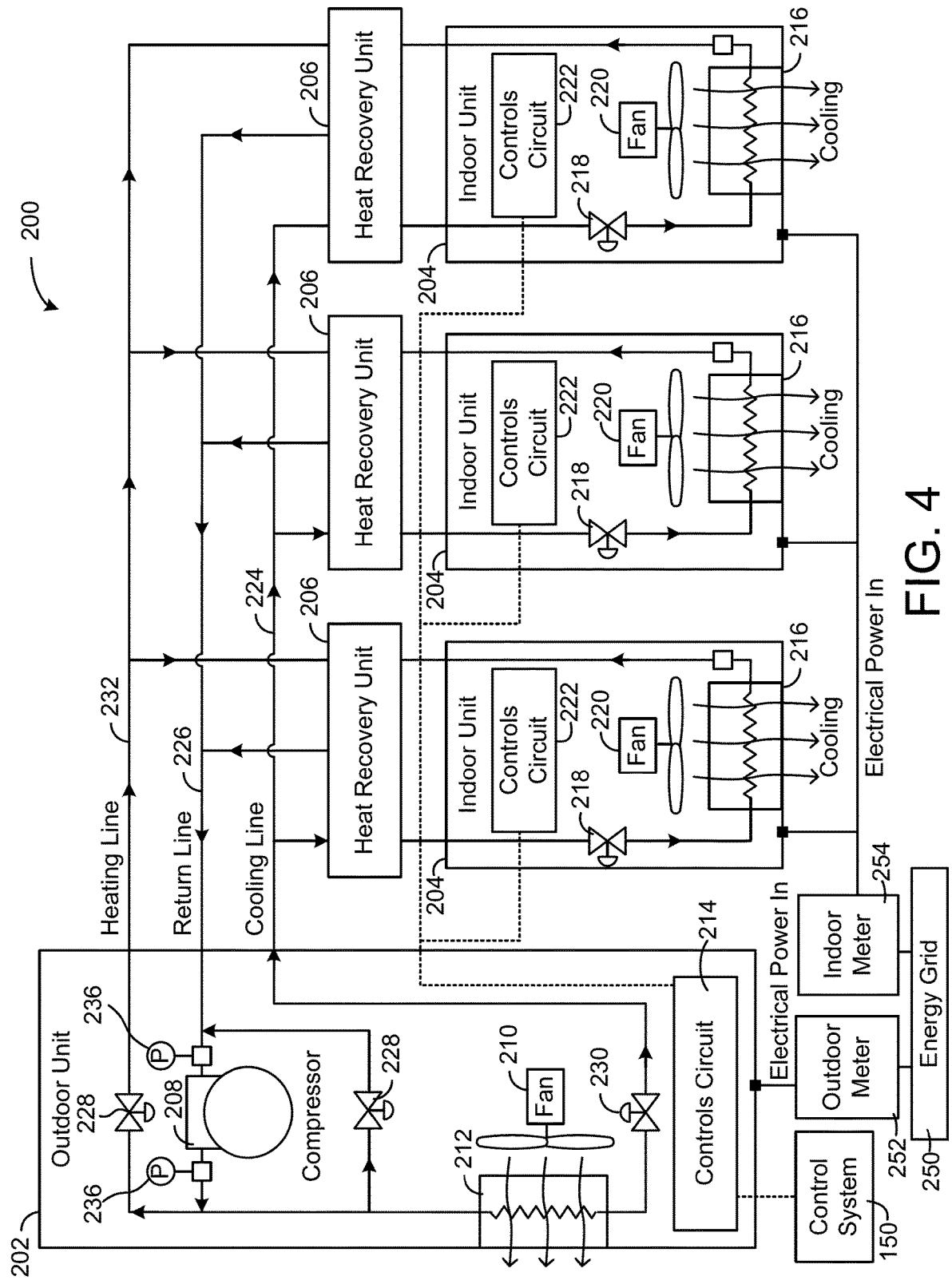
FIG. 4 is a detailed block diagram of a variable refrigerant flow system, according to an exemplary embodiment.
Figure 5:
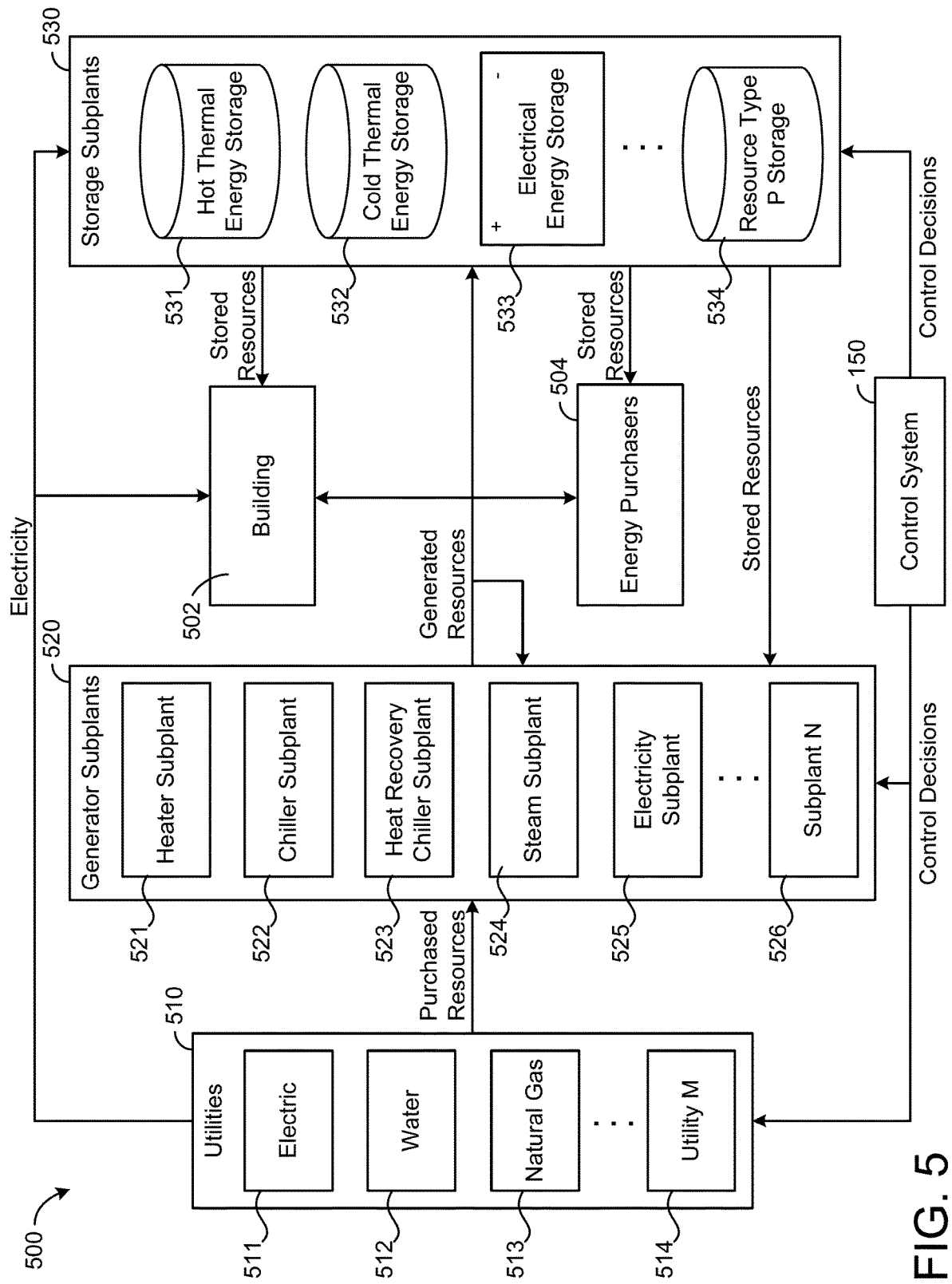
FIG. 5 is a block diagram of a central plant with an energy storage system, according to an exemplary embodiment.

Referring now to FIGS. 1-5, various types of building equipment are shown, according to exemplary embodiments. Building equipment refers to any equipment, device, etc. operable alone or in combination with other equipment to affect a variable state or condition of a building (e.g., temperature, airflow, humidity, light, etc.), including by generating or storing energy for use by other equipment. The embodiments shown and described herein include a heating, ventilation, and cooling (HVAC) system as shown in FIG. 1, a variable refrigerant flow (VRF) system as shown in FIG. 2-4, and a central plant as shown in FIG. 5. It should be understood that variations and combinations of these systems and other building equipment are within the scope of the present disclosure.

Building HVAC Systems

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC system 100 also includes a control system 150. The control system 150 receives data about the HVAC system 100 and the building 10 (e.g., indoor air temperature, outdoor air temperatures, etc.) and generates control signals to control the HVAC system 100 to heat and/or cool the building 10. The control system 150 may be configured for online configurable system identification, as described in detail with reference to FIGS. 6-13.

Variable Refrigerant Flow System

Referring now to FIGS. 2-3, a variable refrigerant flow (VRF) system 200 serving a building 201 is shown, according to some embodiments. VRF system 200 is shown to include one or more outdoor VRF units 202 and a plurality of indoor VRF units 204. Outdoor VRF units 202 can be located outside a building and can operate to heat or cool a refrigerant. Outdoor VRF units 202 can consume electricity to convert refrigerant between liquid, gas, and/or superheated gas phases. Indoor VRF units 204 can be distributed throughout various building zones within a building and can receive the heated or cooled refrigerant from outdoor VRF units 202. Each indoor VRF unit 204 can provide temperature control for the particular building zone in which the indoor VRF unit 204 is located. Although the term "indoor" is used to denote that the indoor VRF units 204 are typically located inside of buildings, in some cases one or more indoor VRF units are located "outdoors" (i.e., outside of a building) for example to heat/cool a patio, entryway, walkway, etc.

One advantage of VRF system 200 is that some indoor VRF units 204 can operate in a cooling mode while other indoor VRF units 204 operate in a heating mode. For example, each of outdoor VRF units 202 and indoor VRF units 204 can operate in a heating mode, a cooling mode, or an off mode. Each building zone can be controlled independently and can have different temperature setpoints. In some embodiments, each building has up to three outdoor VRF units 202 located outside the building (e.g., on a rooftop) and up to 128 indoor VRF units 204 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 200.

Many different configurations exist for VRF system 200. In some embodiments, VRF system 200 is a two-pipe system in which each outdoor VRF unit 202 connects to a single refrigerant return line and a single refrigerant outlet line. In a two-pipe system, all of outdoor VRF units 202 may operate in the same mode since only one of a heated or chilled refrigerant can be provided via the single refrigerant outlet line. In other embodiments, VRF system 200 is a three-pipe system in which each outdoor VRF unit 202 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system 200 is described in detail with reference to FIG. 4.

Referring now to FIG. 4, a block diagram illustrating the VRF system 200 is shown, according to some embodiments. VRF system 200 is shown to include outdoor VRF unit 202, several heat recovery units 206, and several indoor VRF units 204. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by outdoor unit controls circuit 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by outdoor unit controls circuit 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 4, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 2). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 4, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone. For example, the indoor unit controls circuit 222 can generate a signal to turn the fan 220 on and off. Indoor unit controls circuit 222 also determines a heat transfer capacity required by the indoor VRF unit 204 and a frequency of compressor 208 that corresponds to that capacity. When the indoor unit controls circuit 222 determines that the indoor VRF unit 204 must provide heating or cooling of a certain capacity, the indoor unit controls circuit 222 then generates and transmits a compressor frequency request to the outdoor unit controls circuit 214 including the compressor frequency corresponding to the required capacity.

Outdoor unit controls circuit 214 receives compressor frequency requests from one or more indoor unit controls circuits 222 and aggregates the requests, for example by summing the compressor frequency requests into a compressor total frequency. In some embodiments, the compressor frequency has an upper limit, such that the compressor total frequency cannot exceed the upper limit. The outdoor unit controls circuit 214 supplies the compressor total frequency to the compressor, for example as an input frequency given to a DC inverter compressor motor of the compressor. The indoor unit controls circuits 222 and the outdoor unit controls circuit 214 thereby combine to modulate the compressor frequency to match heating/cooling demand. The outdoor unit controls circuit 214 may also generate signals to control valve positions of the flow control valves 228 and expansion valve 230, a compressor power setpoint, a refrigerant flow setpoint, a refrigerant pressure setpoint (e.g., a differential pressure setpoint for the pressure measured by pressure sensors 236), on/off commands, staging commands, or other signals that affect the operation of compressor 208, as well as control signals provided to fan 210 including a fan speed setpoint, a fan power setpoint, an airflow setpoint, on/off commands, or other signals that affect the operation of fan 210.

Indoor unit controls circuits 222 and outdoor unit controls circuit 214 may store and/or provide a data history of one or more control signals generated by or provided to the controls circuits 214, 222. For example, indoor unit controls circuits 222 may store and/or provide a log of generated compressor request frequencies, fan on/off times, and indoor VRF unit 204 on/off times. Outdoor unit controls circuit 214 may store and/or provide a log of compressor request frequencies and/or compressor total frequencies and compressor runtimes.

The VRF system 200 is shown as running on electrical power provided by an energy grid 250 via an outdoor meter 252 and an indoor meter 254. According to various embodiments, the energy grid 250 is any supply of electricity, for example an electrical grid maintained by a utility company and supplied with power by one or more power plants. The outdoor meter 252 measures the electrical power consumption over time of the outdoor VRF unit 202, for example in kilowatt-hours (kWh). The indoor meter 254 measures the electrical power consumption over time of the indoor VRF units 204, for example in kWh. The VRF system 200 incurs energy consumption costs based on the metered electrical power consumption of the outdoor meter 252 and/or the indoor meter 254, as billed by the utility company that provides the electrical power. The price of electrical power (e.g., dollars per kWh) may vary over time.

The VRF system 200 also includes a control system 150. The control system 150 generates control signals that control the operation of the VRF system 200 (e.g., by coordinating the indoor unit controls circuits 222 and the outdoor unit controls circuit 214). The control system 150 may use a model predictive control approach. As described in detail below with reference to FIGS. 6-13, the control system 150 may be configured for online configurable system identification, as described in detail with reference to FIGS. 6-13.

Central Plant with Energy Storage System

Referring now to FIG. 5, a block diagram of an energy storage system 500 is shown, according to an exemplary embodiment. Energy storage system 500 is shown to include a building 502. Building 502 may be the same or similar to buildings 10, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, energy storage system 500 is shown to include control system 150. In the embodiment of FIG. 5, control system 150 may be configured to control the distribution, production, storage, and usage of resources in energy storage system 500. In some embodiments, control system 150 performs an optimization process to determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Control system 150 may be configured to maximize the economic value of operating energy storage system 500 over the duration of the optimization period. The economic value may be defined by a value function that expresses economic value as a function of the control decisions made by control system 150. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by control system 150 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from control system 150.

In some embodiments, one or more of subplants 520-530 includes a subplant level controller configured to control the equipment of the corresponding subplant. For example, control system 150 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, control system 150 maximizes the life cycle economic value of energy storage system 500 while participating in PBDR programs, IBDR programs, or simultaneously in both PBDR and IBDR programs. For the IBDR programs, control system 150 may use statistical estimates of past clearing prices, mileage ratios, and event probabilities to determine the revenue generation potential of selling stored energy to energy purchasers 504. For the PBDR programs, control system 150 may use predictions of ambient conditions, facility thermal loads, and thermodynamic models of installed equipment to estimate the resource consumption of subplants 520. Control system 150 may use predictions of the resource consumption to monetize the costs of running the equipment.

Control system 150 may automatically determine (e.g., without human intervention) a combination of PBDR and/or IBDR programs in which to participate over the optimization period in order to maximize economic value. For example, control system 150 may consider the revenue generation potential of IBDR programs, the cost reduction potential of PBDR programs, and the equipment maintenance/replacement costs that would result from participating in various combinations of the IBDR programs and PBDR programs. Control system 150 may weigh the benefits of participation against the costs of participation to determine an optimal combination of programs in which to participate. Advantageously, this allows control system 150 to determine an optimal set of control decisions that maximize the overall value of operating energy storage system 500.

In some instances, control system 150 may determine that it would be beneficial to participate in an IBDR program when the revenue generation potential is high and/or the costs of participating are low. For example, control system 150 may receive notice of a synchronous reserve event from an IBDR program which requires energy storage system 500 to shed a predetermined amount of power. Control system 150 may determine that it is optimal to participate in the IBDR program if cold thermal energy storage 532 has enough capacity to provide cooling for building 502 while the load on chiller subplant 522 is reduced in order to shed the predetermined amount of power.

In other instances, control system 150 may determine that it would not be beneficial to participate in an MDR program when the resources required to participate are better allocated elsewhere. For example, if building 502 is close to setting a new peak demand that would greatly increase the PBDR costs, control system 150 may determine that only a small portion of the electrical energy stored in electrical energy storage 533 will be sold to energy purchasers 504 in order to participate in a frequency response market. Control system 150 may determine that the remainder of the electrical energy will be used to power chiller subplant 522 to prevent a new peak demand from being set.

In some embodiments, energy storage system 500 and control system 150 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

The control system 150 may utilize a model predictive control approach to fulfill these and other functions, including a stochastic model predictive control approach as described in detail in U.S. patent application Ser. No. 15/963,891, filed Apr. 26, 2018, incorporated by reference herein in its entirety. Furthermore, the control system 150 may be configured for online configurable system identification, as described in detail with reference to FIGS. 6-13.

Building System and State-Space Model

Each of the above embodiments of building equipment include a control system 150 configured to generate controls for the building equipment to maintain a comfortable temperature in the building, minimize utility consumption costs, and/or achieve some other objective. As described in detail below, the control system 150 follows a model predictive control approach. In the model predictive control approach, the control system 150 uses a grey box model to simulate the input/output behavior of the system. In a grey box model, the dynamics of the system are fully described by a small set of parameters.

In the embodiments described herein, the control system 150 utilizes a state-space model with a parameterized Kalman gain, defined by matrices $A(\varphi)$, $B(\varphi)$, $C(\varphi)$, $D(\varphi)$, $K(\varphi)$, where $\varphi$ denotes the set of parameters $\varphi=\{p_1, \ldots, p_n, \ldots, p_N\}$, $p_n \in \mathbb{R}$. More specifically, the control system 150 is configured to handle the set of system models with the discrete-time linear time-invariant form:

$$x(k+1)=Ax(k)+Bu(k)+w(k)$$

$$y(k)=Cx(k)+Du(k)+v(k)$$

where $k \in \|_{\geq 0}$ is the time index, $x(k) \in \mathbb{R}^n$ is the state vector, $y(k) \in \mathbb{R}^p$ is the measured output, and $u(k) \in \mathbb{R}^m$ is the input vector. In this form, $w(k)$ and $v(k)$ denote process disturbance and measurement noise. The Kalman gain $K(\varphi)$ is introduced to deal with these disturbances, leading to an estimation problem in the form:

$$\hat{x}(k+1|k)=A\hat{x}(k|k-1)+Bu(k)+K(y(k)-\hat{y}(k|k-1))$$

$$\hat{y}(k|k-1)=C\hat{x}(k|k-1)+Du(k)$$

where $\hat{x}(j|k)$ is the estimated/predicted state at j given the measurement at k, $\hat{y}(j|k)$ is the predicted output at j given the measurement at k-1, and K is the estimator gain. The Kalman gain may be defined differently in various embodiments, for example based on a multi-step ahead prediction approach as described in detail in U.S. patent application Ser. No. 15/953,324, filed Apr. 13, 2018, incorporated by reference herein in its entirety.

The parameterized system model (the model form) attempts to capture the dynamics of the system, and accordingly is tied to the physics of the system. Thus, for various different arrangements of physical elements of the system (buildings, spaces, equipment, climates, etc.) different numbers of states, outputs, and inputs as well as different parameterizations are required to accurately predict the behavior of the system.

Figure 6:
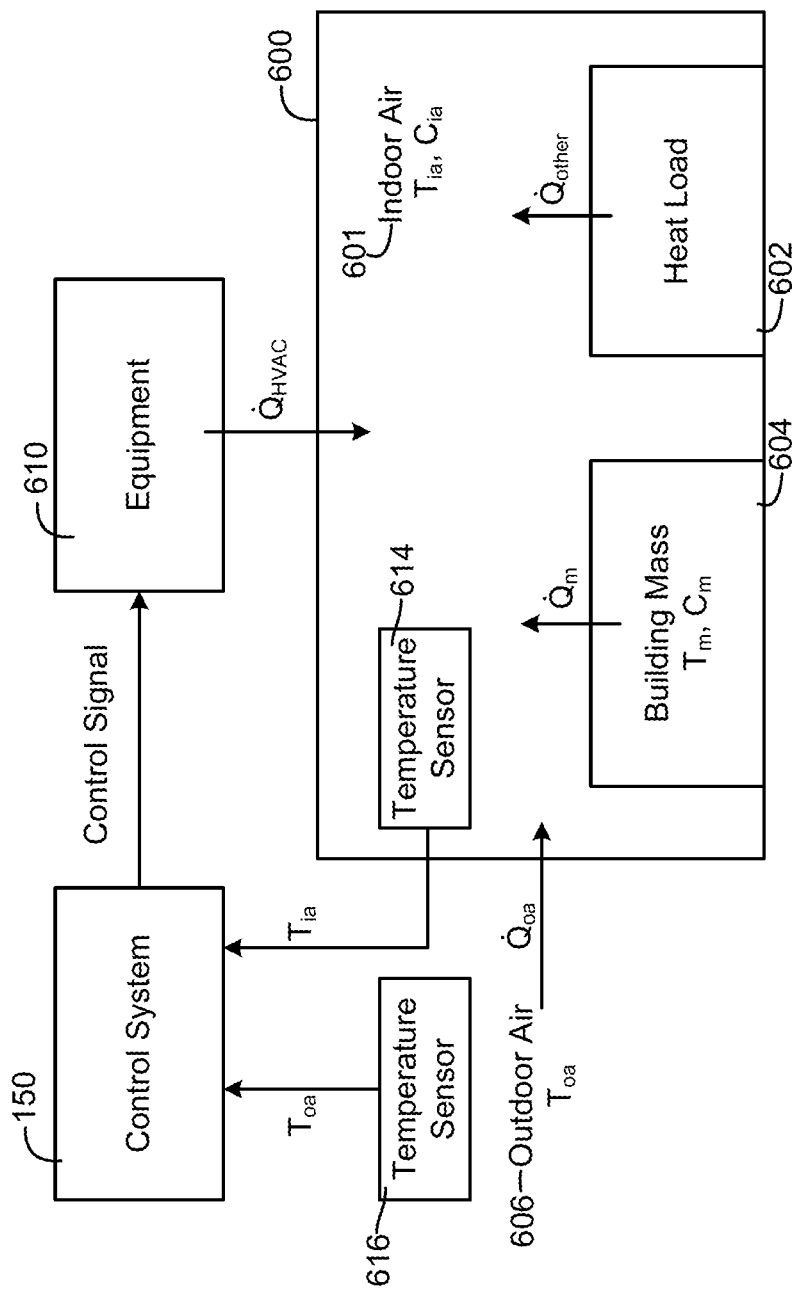
FIG. 6 is a block diagram of heat transfer in a building, according to an exemplary embodiment.
Figure 7:
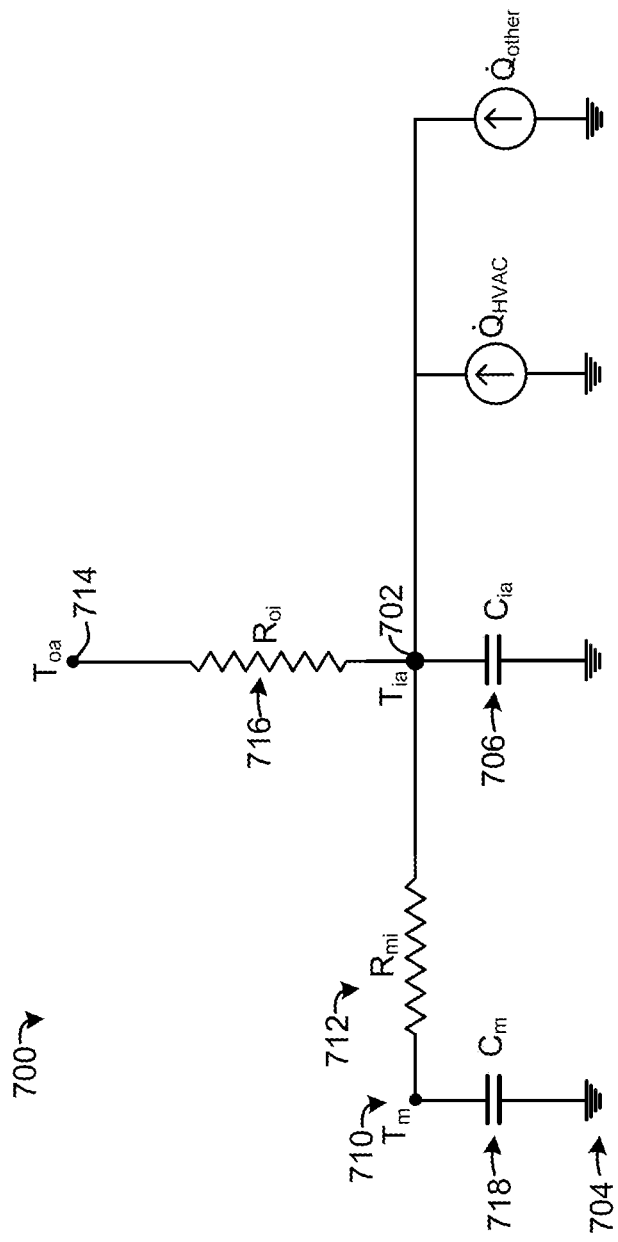
FIG. 7 is a circuit-style diagram of the building of FIG. 6, according to an exemplary embodiment.

For the sake of example and clarity, FIGS. 6-7 show one example of a system for which the form of the system model may be derived from physical principles. It should be understood that this is merely one example, and that various physical systems result in various inputs, outputs, states, and parameterizations, often diverging unpredictably from the first-principles derivation described with reference to FIGS. 6-7 below.

Referring now to FIG. 6, a block diagram of the building equipment 610 serving a building zone 600 is shown, according to an exemplary embodiment. Building zone 600 may be part of building 10 of FIG. 1, building 201 of FIGS. 2-4, or building 502 of FIG. 5. Equipment 610 may include one or more of HVAC system 100, VRF system 200, energy storage system 500, and/or elements thereof. As such, FIG. 6 illustrates one example how a variety of heat transfers may affect the indoor air temperature $T_{ia}$ of the indoor air 601 in zone 600 of building 10. Zone 600 is a room, floor, area, etc. of building 10. The equipment 610 attempts to maintain the indoor air temperature $T_{ia}$ in the zone 600 at or around a desired temperature to facilitate the comfort of occupants of the zone 600 or to meet other needs of the zone 600.

As shown in FIG. 6, the indoor air temperature $T_{ia}$ of the zone 600 has a thermal capacitance $C_{ia}$. The indoor air temperature $T_{ia}$ is affected by a variety of heat transfers $\dot{Q}$ into the zone 600, as described in detail below. It should be understood that although all heat transfers $\dot{Q}$ are shown in FIG. 6 as directed into the zone 600, the value of one or more of the heat transfers $\dot{Q}$ may be negative, such that heat flows out of the zone 600.

The heat load 602 contributes other heat transfer $\dot{Q}_{other}$ to the zone 600. The heat load 602 includes the heat added to the zone by occupants (e.g., people, animals) that give off body heat in the zone 600. The heat load 602 also includes computers, lighting, and other electronic devices in the zone 600 that generate heat through electrical resistance, as well as solar irradiance.

The building mass 604 contributes building mass heat transfer $\dot{Q}_m$ to the zone 600. The building mass 604 includes the physical structures in the building, such as walls, floors, ceilings, furniture, etc., all of which can absorb or give off heat. The building mass 604 has a temperature $T_m$ and a lumped mass thermal capacitance $C_m$. The resistance of the building mass 604 to exchange heat with the indoor air 601 (e.g., due to insulation, thickness/layers of materials, etc.) may be characterized as mass thermal resistance $R_{mi}$.

The outdoor air 606 contributes outside air heat transfer $\dot{Q}_{oa}$ to the zone 600. The outdoor air 606 is the air outside of the building 10 with outdoor air temperature $T_{oa}$. The outdoor air temperature $T_{oa}$ fluctuates with the weather and climate. Barriers between the outdoor air 606 and the indoor air 601 (e.g., walls, closed windows, insulation) create an outdoor-indoor thermal resistance $R_{oi}$ to heat exchange between the outdoor air 606 and the indoor air 601.

The equipment 610 also contributes heat to the zone 600, denoted as $\dot{Q}_{HVAC}$. The equipment 610 is communicably coupled to the control system 150, indoor air temperature sensor 614, and outdoor air temperature sensor 616, and operates in accordance with control signals generated by the control system 150 based at least in part on measurements from the indoor air temperature sensor 614 and outdoor air temperature sensor 616. In the embodiment shown, equipment 610 is controlled by a control system 150 to provide heating (e.g., positive value of $\dot{Q}_{HVAC}$) or cooling (e.g., a negative value of $\dot{Q}_{HVAC}$) to the zone 600.

The indoor air temperature sensor 614 is located in the zone 600, measures the indoor air temperature $T_{ia}$, and provides the measurement of $T_{ia}$ to the control system 150. The outdoor air temperature sensor 616 is located outside of the building 10/201/502, measures the outdoor air temperature $T_{oa}$, and provides the measurement of $T_{oa}$ to the control system 150.

The control system 150 receives the temperature measurements $T_{oa}$ and $T_{ia}$, generates a control signal for the equipment 610, and transmits the control signal to the equipment 610. In the embodiment of FIG. 6, the control system 150 considers a state-space model that captures the effects of the heat load 602, building mass 604, and outdoor air 606 on the indoor air 601 in controlling the equipment 610 to provide a suitable level of $\dot{Q}_{HVAC}$, described in further detail below with reference to reference to FIG. 7.

In the embodiment of FIGS. 6-7, the control signal provided to the equipment 610 by the control system 150 indicates a temperature setpoint $T_{sp}$ for the zone 600. To determine the temperature setpoint $T_{sp}$, the control system 150 assumes that the relationship between the indoor air temperature $T_{ia}$ and the temperature setpoint $T_v$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \quad \text{(Eq. A)}$$

$$\varepsilon_{sp} = T_{sp,j} - T_{ia} \quad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg).

Referring now to FIG. 7, a circuit-style diagram 700 corresponding to the zone 600 and the various heat transfers $\dot{Q}$ of FIG. 6 is shown, according to an exemplary embodiment. In general, the diagram 700 models the zone 600 as a two thermal resistance, two thermal capacitance, control-oriented thermal mass system. This model can be characterized by the following system of linear differential equations, described with reference to FIG. 7 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq. C)}$$

$$C_m\dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 700 as explained below.

Indoor air node 702 corresponds to the indoor air temperature $T_{ia}$. From indoor air node 702, the model branches in several directions, including down to a ground 704 via a capacitor 706 with a capacitance $C_{ia}$. The capacitor 706 models the ability of the indoor air to absorb or release heat and is associated with the rate of change of the indoor heat transfer $\dot{T}_{ia}$. Accordingly, the capacitor 706 enters Eq. C on the left side of the equation as $C_{ia}\dot{T}_{ia}$.

From indoor air node 702, the diagram 700 also branches left to building mass node 710, which corresponds to the thermal mass temperature $T_m$. A resistor 712 with mass thermal resistance $R_{mi}$ separates the indoor air node 702 and the building mass node 710, modeling the heat transfer $\dot{Q}_m$ from the building mass 604 to the indoor air 601 as $$\frac{1}{R_{mi}}(T_m - T_{ia}).$$

This term is included on the right side of Eq. C above as contributing to the rate of change of the indoor air temperature $\dot{T}_{ia}$.

The diagram 700 also branches up from indoor air node 702 to outdoor air node 714. A resistor 716 with outdoor-indoor thermal resistance $R_{oi}$ separates the indoor air node 702 and the outdoor air node 714, modeling the flow heat from the outdoor air 606 to the indoor air 601 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 702, the diagram 700 branches right to two $\dot{Q}$ sources, namely $\dot{Q}_{HVAC}$ and $\dot{Q}_{other}$. As mentioned above, $\dot{Q}_{other}$ corresponds to heat load 602 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the equipment 610 to manage the indoor air temperature $T_{ia}$. Accordingly, $\dot{Q}_{HVAC}$ and $\dot{Q}_{other}$ are included on the right side of Eq. C above.

The second nonlinear differential equation (Eq. D) above focuses on the rate of change $\dot{T}_m$ in the building mass temperature T. The capacity of the building mass to receive or give off heat is modelled by capacitor 718. Capacitor 718 has lumped mass thermal capacitance $C_m$ and is positioned between a ground 704 and the building mass node 710 and regulates the rate of change in the building mass temperature $T_m$. Accordingly, the capacitance $C_m$ is included on left side of Eq. D. Also branching from the building mass node 710 is resistor 712 leading to indoor air node 702. As mentioned above, this branch accounts for heat transfer $\dot{Q}_m$ between the building mass 604 and the indoor air 601. Accordingly, the term $$\frac{1}{R_{mi}}(T_{ia} - T_m)$$

is included on the right side of Eq. D.

As described in detail below, the model form represented by diagram 700 is one example of a model form used by the control system 150 in system identification and in generating a control signal for the equipment 610. More particularly, the control system 150 may use a state-space representation of the model shown in diagram 700. The state-space representation used by the control system 150 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix}\begin{bmatrix} T_{ia} \\ T_m \\ I \end{bmatrix} + \begin{bmatrix} -\frac{K_{p,j}}{C_{ia}} & \frac{1}{C_{ia}R_{oi}} \\ 0 & 0 \\ 1 & 0 \end{bmatrix}\begin{bmatrix} T_{spj} \\ T_{oa} \end{bmatrix} + \begin{bmatrix} 0 \\ \frac{1}{C_{ia}} \\ 0 \end{bmatrix}\dot{Q}_{other};$$

(Eq. E)

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix}\begin{bmatrix} T_{ia} \\ T_m \\ I \end{bmatrix} + \begin{bmatrix} 0 & 0 \\ K_{p,j} & 0 \end{bmatrix}\begin{bmatrix} T_{sp,j} \\ T_{oa} \end{bmatrix};$$

(Eq. F)

where I represents the integral term $\int_0^t \varepsilon_{sp}(s)\,ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the control system 150 models the disturbance $\dot{Q}_{other}$ using an input disturbance model that adds a forth state d to the state space representation, a second phase using the Kalman gain parameter. In a more compact form, this linear system of differential equations can be written as:

$$\dot{x}(t) = A(\varphi)x(t) + B(\varphi)u(t);$$ (Eq. G)

$$y(t) = C(\varphi)x(t) + D(\varphi)u(t);$$ (Eq. H)

where $$A(\varphi) = \begin{bmatrix} -(p_1 + p_2 + p_3 p_4) & p_2 & p_3 p_4 p \\ p_6 & -p & 0 \\ -1 & 0 & 0 \end{bmatrix},$$

$$B(\varphi) = \begin{bmatrix} p_3 p & p \\ 0 & 0 \\ 1 & 0 \end{bmatrix}, \quad C(\varphi) = \begin{bmatrix} 1 & 0 & 0 \\ -p_4 & 0 & p_5 p_4 \end{bmatrix},$$

$$D(\varphi) = \begin{bmatrix} 0 & 0 \\ p_4 & 0 \end{bmatrix}; \quad p_1 = \frac{1}{C_{ia}R_{oi}}; \quad p_2 = \frac{1}{C_{ia}R_{mi}};$$

$$p_3 = \frac{1}{C_{ia}}; \quad p_4 = K_p; \quad p_5 = \frac{1}{\tau}; \quad p_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix}; \quad x(t) = \begin{bmatrix} T_{ia} \\ T_m \\ I \end{bmatrix}; \quad u(t) = \begin{bmatrix} T_{spj} \\ T_{oa} \end{bmatrix}.$$

Thus, FIG. 7 illustrates a system for which a parameterized state-space model can be derived, that is, for which the elements of the matrices A, B, C, D, K can be defined in terms of system parameters $\varphi=\{p_1, \ldots, p_N\}$ (in this example, $\varphi=\{p_1, p_2, p_3, p_4, p_5, p_6\}$). As described in detail below with reference to FIGS. 8-13, the control system 150 is configured to determine the values of the system parameters $\varphi=\{p_1, \ldots, p_N\}$ that minimize a cost function, for example a prediction error cost function. The control system 150 thereby identifies a system model that can be used in model predictive control.

However, for various reasons, various real-world systems may not behave as the idealized diagram 700 illustrated in FIG. 7. In many cases, the input/output behavior of a system diverges substantially from what is predicted by the parameterized state-space model of FIG. 7, even with optimized parameter values. A different parametrization (i.e., a different definition of the elements of the matrices A, B, C, D, K in terms of system parameters $\varphi=\{p_1, \ldots, p_N\}$) may be required to accurately predict system behavior.

Thus, to facilitate better system identification, as described in detail below, the control system 150 provides improved system identification that facilitates online configuration of the parameterized state-space model and other options in a user-friendly, intuitive, and efficient way.

Control System with Online Configurable System Identification

Figure 8:
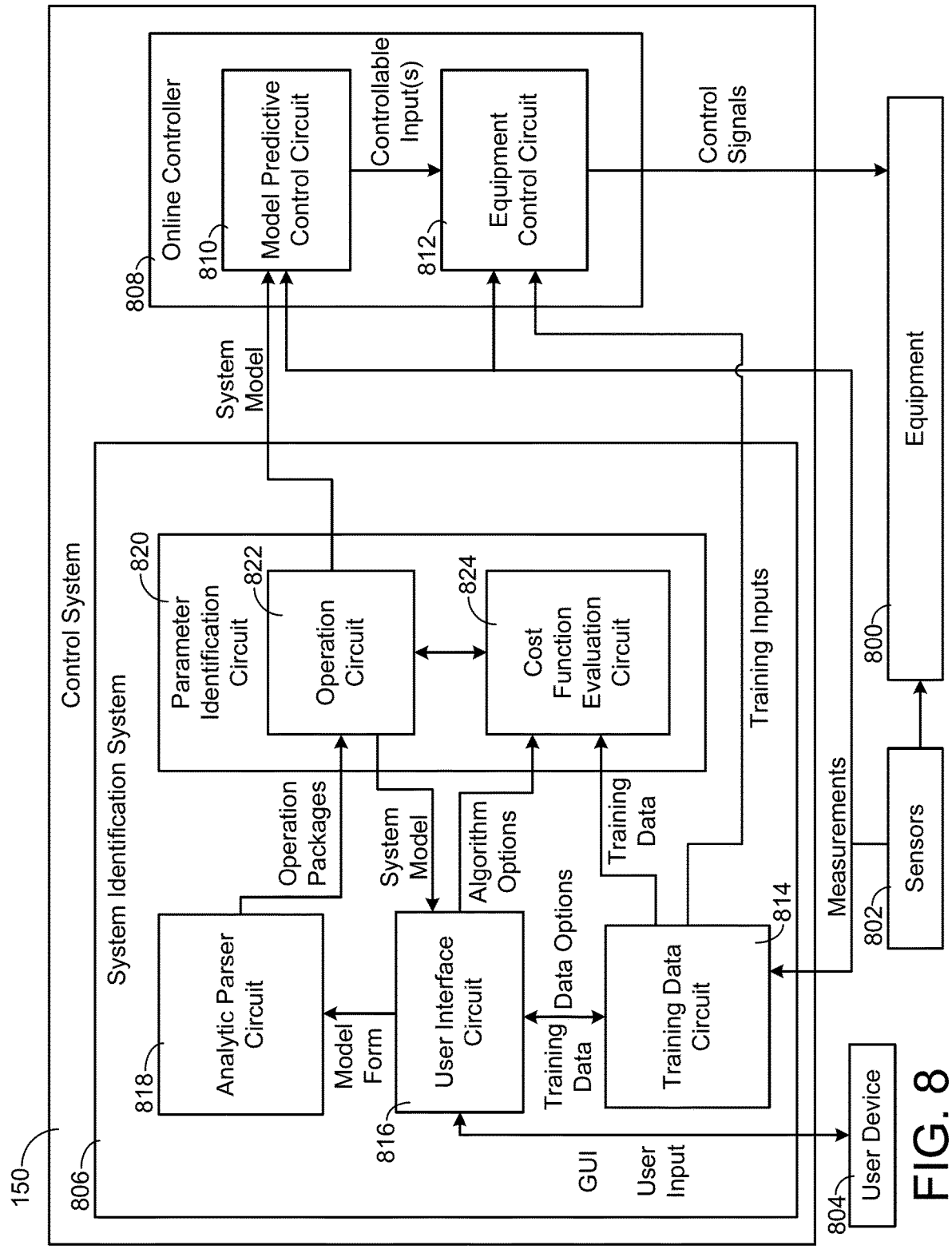
FIG. 8 is a block diagram of a control system for controlling the HVAC system of FIG. 1, the variable refrigerant flow system of FIGS. 2-4, and/or the central plant of FIG. 5, according to an exemplary embodiment.

Referring now to FIG. 8, a block diagram of the control system 150 is shown, according to an exemplary embodiment. As described in detail below, the control system 150 is configured to provide online configurable system identification and to control building equipment 800 using model predictive control. Building equipment 800 may include one or more of HVAC system 100, VRF system 200, energy storage system 500, or one or more components thereof. The control system 150 is communicable with sensors 802 that provide measurements of physical values relating to the building equipment 800 and one or more buildings or building zones served by the building equipment 800. The control system 150 is also communicable with a user device 804 to allow a user to receive information from the control system 150 and provide input to the control system 150, as described in detail below. User device 804 may include one or more of a smartphone, tablet, laptop, desktop computer, etc.

As shown in FIG. 8, the control system 150 includes a system identification system 806 and an online controller

808. The system identification system 806 facilitates system identification to generate a system model for use by the online controller 808 to generate control signals for equipment 800 using model predictive control.

The online controller 808 includes a model predictive control circuit 810 and an equipment control circuit 812. The model predictive control circuit 810 generates an input for the system based on the predicted behavior of the system to minimize energy costs, maximize occupant comfort, or optimize some other objective function. The model predictive control circuit 810 receives a system model (i.e., with parameter values identified) from the system identification system 806 and measurements from the sensors 802 (e.g., indoor air temperature, outdoor air temperature, humidity, air speed). The model predictive control circuit 810 may also receive data from various other sources, for example weather forecasts from a weather service (e.g., accessible via the internet) and/or utility prices from a utility company computing system. The model predictive control circuit 810 then uses the system model, current measurements, and, in some cases, various other data to predict future behavior of the system and determine a desired value of one or more controllable inputs to the system (i.e., to the state-space model) to provide to the equipment control circuit 812. For example, in the example of FIGS. 6-7, the model predictive control circuit 810 may generate a value of $\dot{Q}_{HVAC}$ and provide the value of $\dot{Q}_{HVAC}$ to the equipment control circuit 812.

The equipment control circuit 812 receives the input(s) generated by the model predictive control circuit 810 and generates control signals for the equipment 800 based on the input(s). That is, the equipment control circuit 812 controls the equipment 800 to provide the input(s) to the system. For example, the equipment control circuit 812 may provide the equipment 800 with a temperature setpoint, compressor frequency, fan speed, damper position, battery discharge rate, etc. that achieves the input(s) (e.g., a temperature setpoint that causes the equipment 800 to provide a rate of heat $\dot{Q}_{HVAC}$).

The system identification system 806 is configured to generate a system model for use by the model predictive control circuit 810 based on system identification using real training data from the system. As described in detail below, the system identification system 806 includes a training data circuit 814, a user interface circuit 816, an analytic parser circuit 818, and a parameter identification circuit 820.

The training data circuit 814 is configured to collect, filter, and otherwise develop a set of training data, i.e., a set of input values and output values for each time step in a training period. In the embodiment shown, the training data circuit 814 facilitates the generation of training data by providing training inputs to the equipment control circuit 812. The training inputs may cover a range of values to facilitate creation of a robust set of training data. The equipment control circuit 812 may generate control signals for the equipment 800 based on the training inputs. The sensors 802 then capture measurements relating to the building served by the equipment 800 and provide the measurements to the training data circuit 814. The training data circuit 814 then collects the training inputs and the measurements in set of training data. As described in detail below, the training data is used by the system identification system 806 to determine the values of parameters in the system model. In some embodiments, a portion of the training data is saved for validation of the identified system model, i.e., to compare predictions made using the system model to the training data to evaluate how well the system model fits the real system behavior.

The user interface circuit 816 is configured to provide a user with a user-friendly graphical user interface for performing online configurable system identification. Example views in the graphical user interface are shown in FIGS. 10-13. The user interface circuit 816 provides the graphical user interface to the user device 804 for display to the user, and receives user input relating to the graphical user interface from the user device 804.

Figure 10:
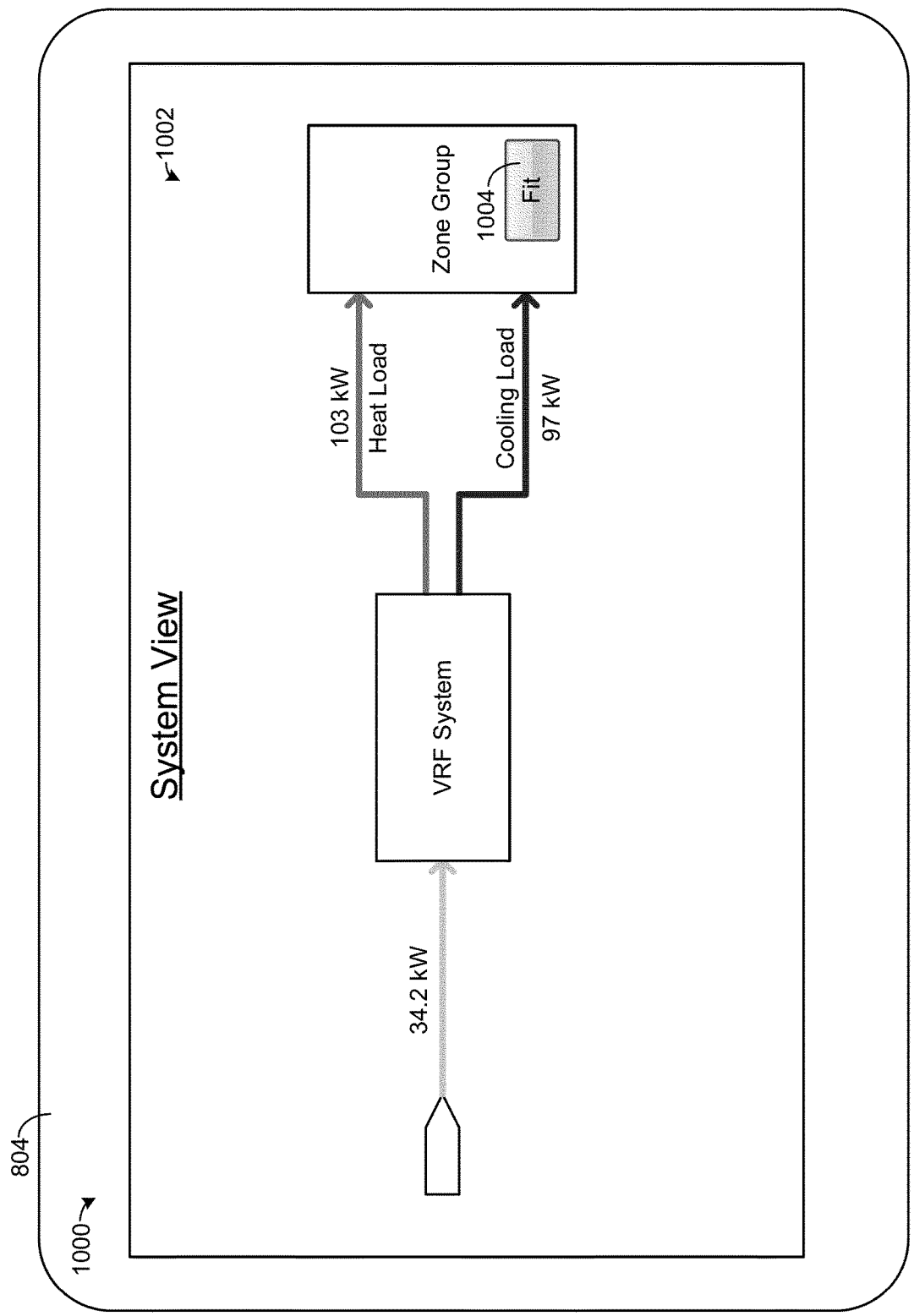
FIG. 10 is a first view in a graphical user interface generated by the control system of FIG. 8, according to an exemplary embodiment.

The user interface circuit 816 is configured to generate a graphical user interface that shows a schematic diagram of the equipment and/or building. An example is shown in FIG. 10 and described in detail with reference thereto. The schematic diagram may indicate a current status of the equipment, current conditions in the building, etc. In some embodiments, the graphical user interface is provided as part of a user interface for a building management system or energy management system, for example the Metasys® Energy Management System by Johnson Controls. The schematic diagram may visualize the inputs and outputs of the system for which a system model is identified as detailed below.

Figure 11:
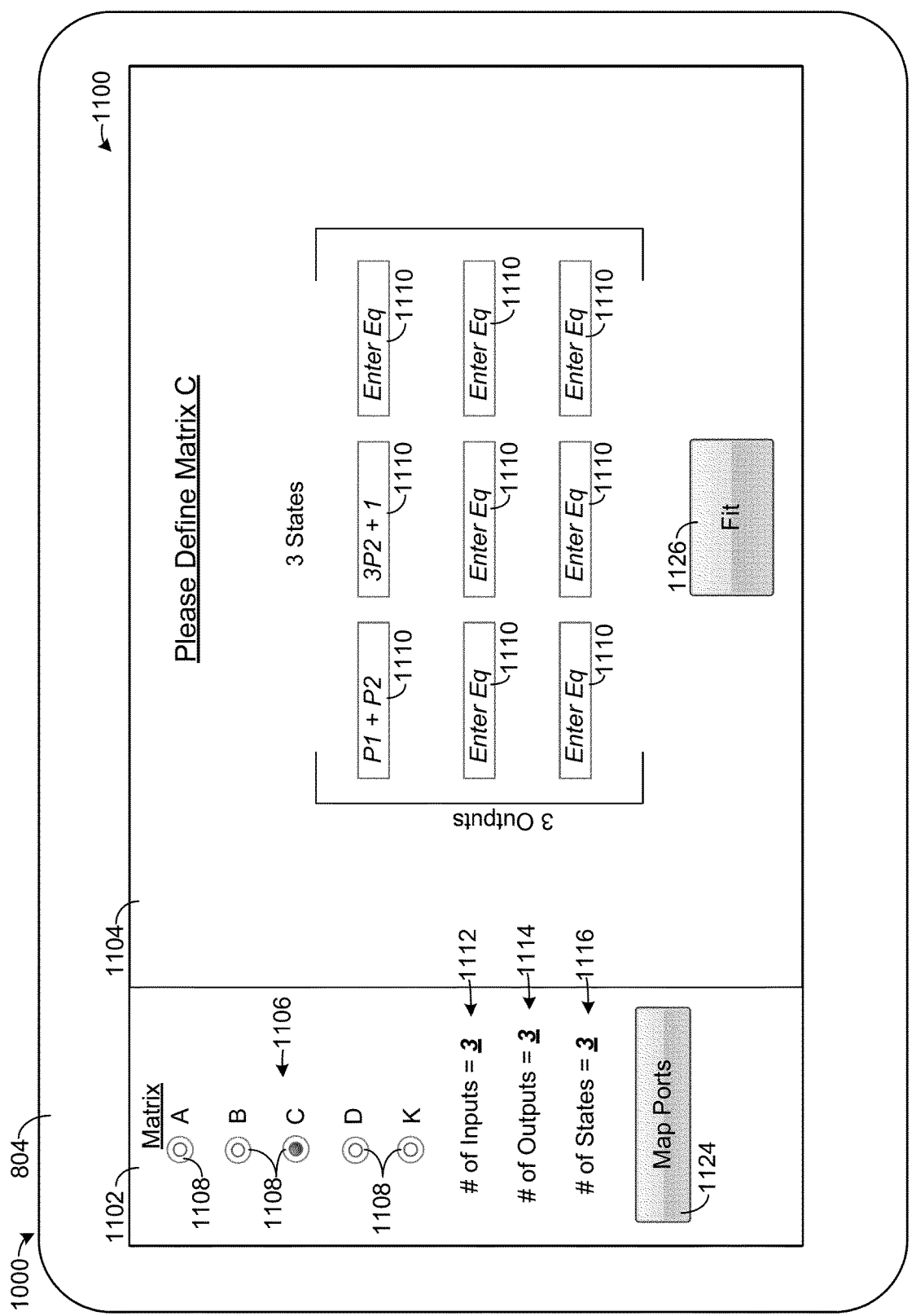
FIG. 11 is a second view in a graphical user interface generated by the control system of FIG. 8, according to an exemplary embodiment.

The user interface circuit 816 is further configured to generate a graphical user interface that prompts the user to define the parameterized model form for the system. An example of such a graphical user interface is shown in FIG. 11 and described in detail with reference thereto. More particularly, the user interface circuit 816 prompts a user to select the number of inputs, outputs, and states for the system model and define the matrices $A(\varphi)$, $B(\varphi)$, $C(\varphi)$, $D(\varphi)$, $K(\varphi)$ in terms of $\varphi = \{p_1, \ldots, p_n, \ldots p_N\}$. The user interface circuit 816 may also generate a graphical user interface that allows a user to map controller ports (i.e., data inputs and control outputs) of one or more controllers to variables in the parameterized model form. The user interface circuit 816 may then receive user input to the graphical user interface that defines the parameterized model form and provide the parameterized model form to the analytic parser circuit 818.

The user interface circuit 816 may also be configured to generate a graphical user interface that shows a graphical representation of the fit of the data. The user interface circuit 816 may be configured to receive the identified system model (i.e., the system model with parameter values determined) from the parameter identification circuit 820, generate predictions for a validation period based on the system model, and generate one or more visualizations comparing the predictions of the system model with validation training data from the training data circuit 814. The user interface circuit 816 may calculate and provide a graphical representation of a weighted mean absolute prediction error (WMAPE) (e.g., a plot of the weighted average of the prediction errors within a prediction horizon for each point within a training set) and/or root mean squared prediction error (RMSPE) (e.g., a plot of average prediction errors for a multiple steps into the future) to facilitate visualization of how well the identified system model predicts real system behavior. The user interface circuit 816 thereby facilitates a user in determine whether the parameterized model form resulted in a sufficiently accurate system model.

Figure 13:
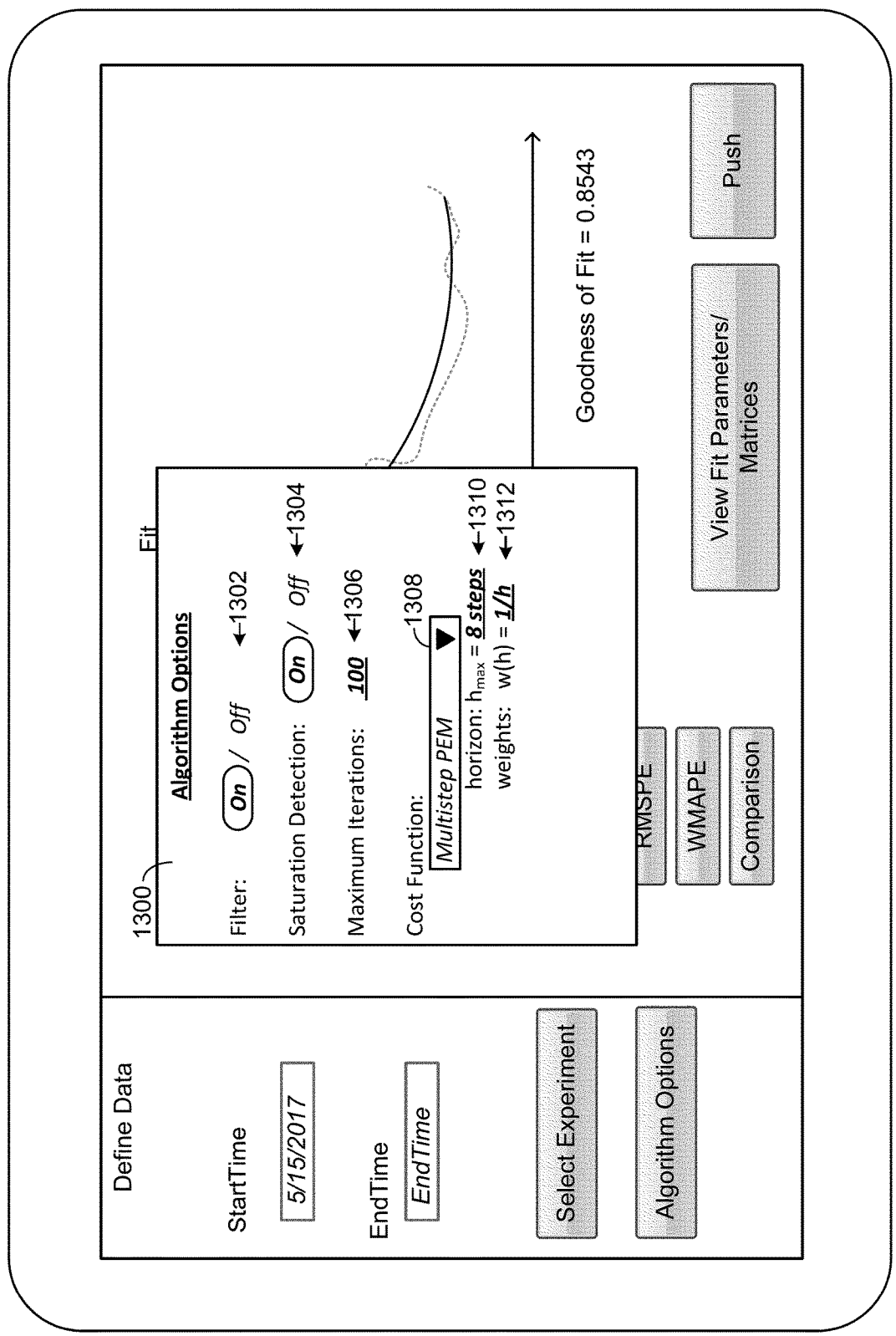
FIG. 13 is a fourth view in a graphical user interface generated by the control system of FIG. 8, according to an exemplary embodiment.

The user interface circuit 816 may also provide options on the graphical user interface that allow the user to select options relating to the training data generated by the training data circuit 814 and/or the parameter identification carried out by the parameter identification circuit 820. For example, the user interface circuit 816 may provide an option for a user to instruct the training data circuit 814 to apply a saturation detection and removal filter to the training data, for example as described in U.S. patent application Ser. No. 15/900,459 filed Feb. 20, 2018, incorporated by reference herein in its entirety. As another example, the user interface circuit 816 may provide an option to select between multiple prediction error methods for use by the parameter identification circuit 820, for example the one-step ahead prediction error method, multi-step ahead prediction error method, and the simulation prediction error method described in detail in U.S. patent application Ser. No. 15/953,324, filed Apr. 13, 2018, incorporated by reference in its entirety herein. Various other options are possible, for example as shown in FIG. 13 and described in detail with reference thereto. The user interface circuit 816 provides the user-selected options to the training data circuit 814 and/or the parameter identification circuit 820 as applicable to implement the user's selections. The user interface circuit 816 may facilitate a recalculation of model parameter values and regenerate one or more graphical representations of the fit of the system model in response to a user selection of new options.

Figure 12:
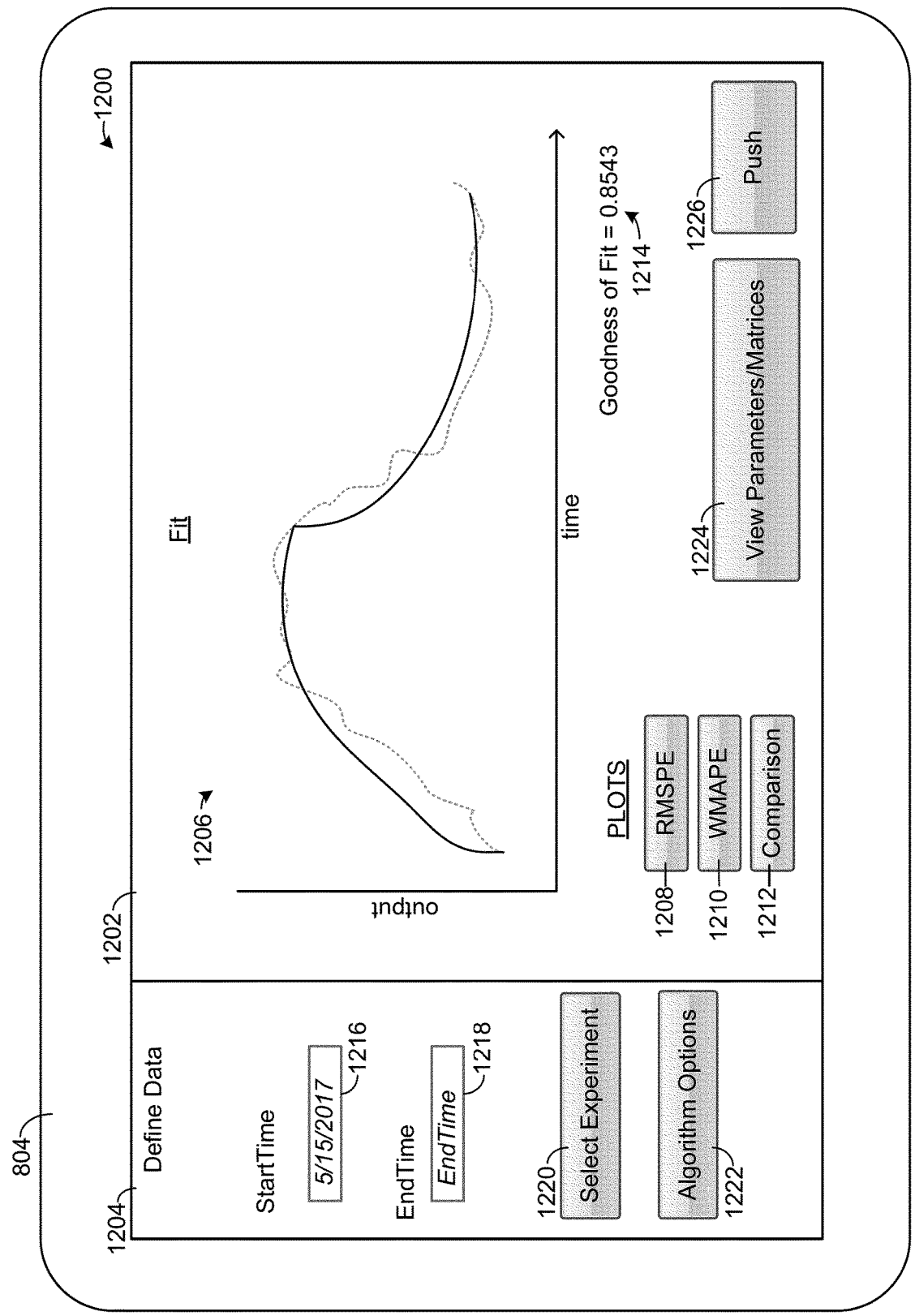
FIG. 12 is a third view in a graphical user interface generated by the control system of FIG. 8, according to an exemplary embodiment.

The user interface circuit 816 further provides an option to push the system model to the online controller 808 and the model predictive control circuit 810 for use in online control. The user interface circuit 816 may provide the push option alongside one or more graphs of the fit of the system model, for example as shown in FIG. 12. In response to a user selection of the option to push the system model to the online controller 808, the user interface circuit 816 provides the system model to the online controller 808 and/or instructs the parameter identification circuit 820 to provide the system model to the online controller 808.

As mentioned above, the user interface circuit 816 receives a user input defining the parameterized model form and provides the parameterized model form to the analytic parser circuit 818. The analytic parser circuit 818 thus receives the matrices $A(\varphi)$, $B(\varphi)$, $C(\varphi)$, $D(\varphi)$, $K(\varphi)$ defined in terms of $\varphi=\{p_1, \ldots, p_n, \ldots p_N\}$. More particular, as received by the analytic parser circuit 818, each element of each matrix $A(\varphi)$, $B(\varphi)$, $C(\varphi)$, $D(\varphi)$, $K(\varphi)$ may be defined as an arithmetic operation using one or more parameters $p_1, \ldots, p_n, \ldots p_N$ and/or one or more real-valued constants. For example, in some cases the matrix A may be defined as $$A(\varphi) = \begin{bmatrix} p_1 & p_2+1 \\ p_3 p_4 + 3 & 0 \end{bmatrix}.$$

The analytic parser circuit 818 receives the matrices $A(\varphi)$, $B(\varphi)$, $C(\varphi)$, $D(\varphi)$, $K(\varphi)$ defined in this matrix format.

The analytic parser circuit 818 is configured to convert each element in the matrix format into a sequence of machine-executable arithmetic steps (e.g., each step containing one addition, multiplication, division, or subtraction). For example, the analytic parser circuit 818 may convert element $A_{21}$ of matrix $A(\varphi)$ in the example above (i.e., $(p_3 p_4+3)$) into the following two-step sequence:
1. Multiply p3, p4.
2. Add result$_1$, 3.

which causes the operation circuit 822 to multiply $p_3$ and $p_4$ and add three to the product of $p_3$ and $p_4$.

The analytic parser circuit 818 may follow various order-of-operations rules and notational rules in converting user-input element definitions into sequences of machine-executable arithmetic steps. The analytic parser circuit 818 collects the sequence of machine-executable arithmetic steps for each element of each matrix to create an operation package for the model form. The analytic parser circuit 818 then provides the operation package to the parameter identification circuit 820, and more particularly to an operation circuit 822 of the parameter identification circuit 820.

The parameter identification circuit 820 includes an operation circuit 822 and a cost function evaluation circuit 824. The cost function evaluation circuit 824 is structured to minimize a prediction error cost function with respect to $\varphi$. For example, in some cases the cost function evaluation circuit 824 determines that values of $\varphi=\{p_1, \ldots, p_n, \ldots p_N\}$ which minimize:

$$J(\varphi)=\Sigma_k l(y_k-\hat{y}_k(\varphi,u_k)),$$

where $y_k$ is the actual value of the output y at time step k from the training data, $u_k$ is the actual value of input u at time step k from the training data, $\hat{y}_k(\varphi, u_k)$ is the predicted value of the output y at time step k based on the system model with parameters $\varphi$, and l is a function of the error, for example the square function. Various cost functions are possible, for example as described in U.S. patent application Ser. No. 15/953,324, filed Apr. 13, 2018, incorporated by reference in its entirety herein.

To minimize $J(\varphi)$, the parameter identification circuit 820 calculates the value of $J(\varphi)$ for each of a plurality of values of the parameters $\varphi=\{p_1, \ldots, p_n, \ldots p_N\}$ using training data from the training data circuit 814. The cost function evaluation circuit 824 and/or a user via a user interface generated by the user interface circuit 816 selects an initial set of parameter values $\varphi_0$. The cost function evaluation circuit 824 provides $\varphi_0$ to the operation circuit 822, which uses the operation package from the analytic parser circuit 818 to calculate a real value for each element in each matrix $A(\varphi_0)$, $B(\varphi_0)$, $C(\varphi_0)$, $D(\varphi_0)$, $K(\varphi_0)$. The operation circuit 822 then provides the matrices $A(\varphi_0)$, $B(\varphi_0)$, $C(\varphi_0)$, $D(\varphi_0)$, $K(\varphi_0)$ to the cost function evaluation circuit 824, which uses the matrices $A(\varphi_0)$, $B(\varphi_0)$, $C(\varphi_0)$, $D(\varphi_0)$, $K(\varphi_0)$ to calculate and store $J(\varphi_0)$.

The cost function evaluation circuit 824 then selects another set of parameter values $\varphi_1$, provides $\varphi_1$ to the operation circuit 822 which again uses the operation package to calculate values for the elements of $A(\varphi_1)$, $B(\varphi_1)$, $C(\varphi_1)$, $D(\varphi_1)$, $K(\varphi_1)$. The cost function evaluation circuit 824 then calculates and stores a value of the cost function $J(\varphi_1)$. The parameter identification circuit 820 repeats these steps, iterating through a number N of sets of parameter values $\varphi_n$, $n=\{0, \ldots, N-1\}$ to calculate $J(\varphi_n)$. At each iteration, the cost function evaluation circuit 824 may select the next set of parameter values $\varphi_{n+1}$ based on a trend in the previously calculated cost function values that suggests how to adjust the values $\varphi_n$ to approach a minimum with $\varphi_{n+1}$ (e.g., following a descending gradient).

The cost function evaluation circuit 824 thereby calculates a plurality of cost function values $J(\varphi_n)$, $n=\{0, \ldots, N-1\}$. The cost function evaluation circuit 824 can then identify the set of parameter values $\varphi_n$ corresponding to the lowest value of $J(\varphi_n)$ and, in response, determine those parameter values $\varphi_n$ as the model parameters. The operation circuit 822 may then calculate the values of the elements of the matrices $A(\varphi_n)$, $B(\varphi_n)$, $C(\varphi_n)$, $D(\varphi_n)$, $K(\varphi_n)$ to define the system model. The parameter identification circuit 820 thereby identifies the system model. The system model may then be provided to the user interface circuit 816 and/or the model predictive control circuit 810.

Figure 9:
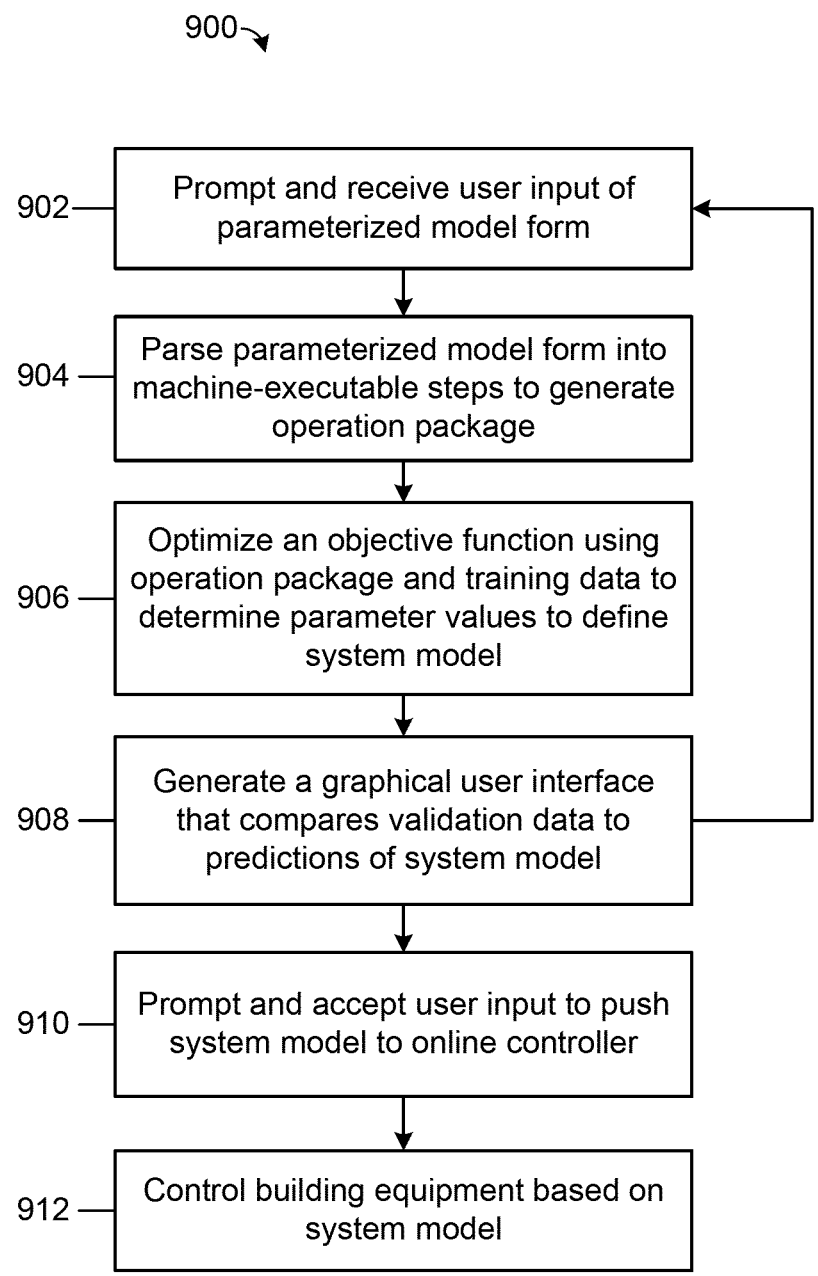
FIG. 9 is a flowchart of a process for online configurable system identification executable by the control system of FIG. 8, according to an exemplary embodiment.

Referring now to FIG. 9, a flowchart of a process 900 for online configurable system identification is shown, according to an exemplary embodiment. Process 900 can be carried out by the control system 150 of FIG. 8, and reference is made thereto in the following description.

At step 902, the control system 150 prompts and receives user input of a parameterized model form. In some embodiments, the user interface circuit 816 generates a graphical user interface that allows a user to input a number of inputs, outputs, and states and define each element of each matrix $A(\varphi)$, $B(\varphi)$, $C(\varphi)$, $D(\varphi)$, $K(\varphi)$ in terms mathematical operations between $p_1, \ldots p_n, \ldots p_N$ and one or more constants. The control system 150 may restrict the number of inputs, outputs, and states to ensure the dimensions of the matrices and vectors are related as required by the state-space model and/or generate an error message when such conditions are violated. The control system 150 may allow the user to choose the number of parameters $p_n$ (i.e., to choose N as used in $\varphi = \{p_1, \ldots p_n, \ldots p_N\}$). The user input defines the parameterize model form in an analytic, human-readable matrix format.

At step 904, the control system 150 parses the parameterized model form to generate an operation package that contains the machine-executable arithmetic steps necessary to determine a value for each element of the matrices $A(\varphi)$, $B(\varphi)$, $C(\varphi)$, $D(\varphi)$, $K(\varphi)$. That is, the control system 150 converts parameterized model form as input by a human user into a format executable by a processor to calculate the value of each matrix element. Because the control system 150 does this conversion automatically, the control system 150 eliminates the need for a user to manually draft new software code that calculates the matrix values each time the model form is updated.

At step 906, the control system 150 optimizes an objective function using the operation package and training data to determine parameter values to define the system model. For example, the control system 150 may minimize a prediction error function, for example as described in U.S. patent application Ser. No. 15/953,324, filed Apr. 13, 2018, incorporated by reference herein in its entirety. The control system 150 determines the values of the parameters and uses the operation package to determine the value of each element of the matrices A, B, C, D, K based on those parameter values to define the system model.

At step 908, the control system 150 generates a graphical user interface depicting a comparison between validation data (a subset of training data unused in system step 906) and predictions made using the system model. That is, the control system 150 predicts the output for each time step over a prediction horizon and uses those predictions to generate a graph or other visualization of the predict outputs and/or the actual outputs from the validation data. In some embodiments, the control system 150 calculates and charts the WMAPE and/or RMSPE. The control system 150 may allow the user to select various views, comparisons, metrics, etc. relating to the fit between the system model and the real system behavior.

The control system 150 may thereby facilitate a user in determining whether the model form input by the user resulted in a system model that provides satisfactorily or sufficiently accurate predictions. If the user determines that the system model does not fit the system behavior sufficiently, the user may select an option provided by the control system 150 to return to step 902, where the control system 150 prompts the user to input or edit the parameterized model form. In some embodiments, the control system 150 allows the user to select or alter various other settings, including adding filters to the training data, selecting an amount of training data captured and used, implementing a saturation detection and removal process for the training data, selecting one of various available cost functions, selecting a horizon for a multi-step ahead error prediction method, selecting a number of sets of parameter values tried by the cost function evaluation circuit 824 in minimizing the cost function, and/or various other options. Process 900 may then repeat steps 904-908 using the new parameterized model form and/or settings input by the user.

At step 910 the control system 150 prompts and accepts user input to push the system model to the online controller 808. The control system 150 may include a button or icon on the graphical user interface generated in step 908 that may be selected by a user to cause the system model to be implemented by the online controller 808 (i.e., to instruct the online controller 808 start using the system model). Thus, if the user determines that the system model provides satisfactory predictions by viewing the graphical user interface generated at step 908, the user may input an indication of approval to accept the system model identified in step 906.

At step 912, the control system 150 controls building equipment based on the system model. The control system 150 may use the system model in a model predictive control approach to generate control signals for the building equipment, for example to minimize utility costs, maximize occupant comfort, and/or optimize some cost function that incorporates those or other considerations. For example, the control system 150 may use the system model to control building equipment to provide variable levels of heating and/or cooling to a building over a time period. The building equipment controlled at step 912 may include one or more of HVAC system 100 of FIG. 1, VRF system 200 of FIGS. 2-4, energy storage system 500 of FIG. 5, and/or elements thereof.

Graphical User Interfaces for Online Configurable System Identification

Referring now to FIG. 10, a system view 1002 in a graphical user interface 1000 generated by the control system 150 and presented on user device 804 is shown, according to an exemplary embodiment. In the embodiment shown, the system view 1002 depicts a schematic representation of the VRF system 200 of FIGS. 2-4, according to an exemplary embodiment. The system view 1002 shows a current status of the VRF system 200, for example various power loads of the VRF system 200.

The system view 1002 includes a fit button 1004. The fit button 1004 may be selected by a user to navigate to a new window that allows a user to fit a system model to the system shown in the system view 1002. In the embodiment shown, when a user selects the fit button 1004, the graphical user interface 1000 switches to the model form definition view 1100 shown in FIG. 11.

Referring now to FIG. 11, a model form definition view 1100 of the graphical user interface 1000 is shown on the user device 804, according to an exemplary embodiment. The model form definition view 1100 includes a navigation pane 1102 and a matrix definition widget 1104.

The navigation pane includes an input count field 1112, and output count field 1114, and a states count field 1116. The input count field 1112 allows a user to select the number of inputs in the model form, the output count field 1114 allows a user to select the number of outputs in the model form, and the states count field 1116. Each of the input count field 112, output count field 1114, and states count field 1116 may allow a user to select a value for that field using a drop down menu or by allowing a user to type a number into an entry blank. The graphical user interface 1000 may display a warning or error message if the values in the input count field 112, output count field 1114, and states count field 1116 do not allow for matrices and vectors with dimensions consistent with the state-space representation used herein (i.e., as shown in Eqs. G-H above).

The navigation pane includes a matrices list 1106 that includes a radio button 1108 corresponding to each of the matrices A, B, C, D, K. Each radio button 1108 is selectable to view and define the corresponding matrix in the matrix definition widget 1104.

In the illustrative example of FIG. 11, the radio button 1108 corresponding to matrix C is selected. Accordingly, the matrix definition widget 1104 is configured to allow the user to define the matrix C. More particularly, the matrix definition widget 1104 includes an element entry field 1110 for each of the elements of the matrix C. In the example shown, the output count field 1114 has a value of three and the states count field 1116 has a value of three, implying that matrix C must be a three-by-three matrix. Thus, the matrix definition widget 1104 includes nine element entry fields 1110 arranged in a three-by-three array.

Each element entry field 1110 may be selected to enter a definition for that field in terms of parameters $\{p_1, \ldots, p_n, \ldots p_N\}$. In the example shown, the element entry field 1110 in the $C_{11}$ position shows the definition $p_1+p_2$, while the element entry field 1110 in the $C_{12}$ shows the definition $3p_2+1$. In response to a user selection of an element entry field 1110, the graphical user interface 1000 may launch a mathematical keyboard that allows a user to select operations (addition +, subtraction −, division /, multiplication *), numbers, parameters and/or any other specialized mathematical symbols. The user may use the mathematical keyboard and/or some other input device to enter a definition for each element entry field 1110. In some embodiments, undefined element entry fields 1110 may default to a value of zero. By sequentially selecting each radio button 1108 included with matrices list 1106 and editing the element entry fields 1110 that appear in the matrix definition widget 1104, the user can parameterize the model.

The navigation pane 1102 further comprises a map ports button 1124. The map ports button 1124 may be selected to launch a map ports mode in which the graphical user interface is configured to allow the user to associate ports (i.e., inputs and outputs on controller or other input/output device) with variables in the state-space model. The map ports button 1124 thereby facilitates the user in fully defining the parameterized model form for the system.

Still referring to FIG. 11, the model form definition view 1100 further includes a fit button 1126. The fit button 1126 may be selected by the user to initiate a system identification process using the model form defined by the user using the model form definition view 1100. In response to a user selection of the fit button 1126, the user device 804 and/or the user interface circuit 816 provides the model form defined by the user (i.e., as shown in the matrix definition widget 1104) to the analytic parser circuit 818 for conversion into machine-executable operational steps.

Referring now to FIG. 12, a fit evaluation view 1200 is shown on the user device 804, according to an exemplary embodiment. The fit evaluation view 1200 allows a user to evaluate how well a system model generated based on the model form input by the user to the model form definition view 1100 matches the real-world system. More particularly, the fit evaluation view 1200 allows a user to evaluate how well a timeseries of predicted outputs matches real-world (e.g., measured) outputs over a time span. The fit evaluation view 1200 includes a plot widget 1202 and a data definition widget 1204.

As shown in FIG. 12, the plot widget 1202 includes a plot (graph) 1206 comparing predicted outputs to actual system behavior over time. The plot widget 1202 also includes RMSPE button 1208 that may be selected to change the plot 1206 to a plot of RMSPE, and a WMAPE button 1210 that may be selected to change the plot 1206 to a plot of WMAPE. A comparison button 1212 may be selected to return from a plot of RMSPE or WMAPE to the plot 1206 shown in FIG. 12. A fit indicator 1214 gives a numerical representation of the goodness of the fit (e.g., $R^2$ value).

The plot widget 1202 also includes a view parameters/matrices button 1224. The view parameters/matrices button 1224 is selectable to navigate back to the model form definition view 1100 shown in FIG. 11. Thus, a user may select the view parameters/matrices button 1224 to return to the model form definition view 1100 to view, edit, revise, etc. the parameterized model form.

The plot widget 1202 also includes a push button 1226. The push button 1226 may be selected by a user to indicate that the user is satisfied with the fit shown in the plot 1206 and to instruct the control system 150 to apply the identified system model in online control. In other words, in response to a user selection of the push button 1226, the system identification system 806 provides the system model to the online controller 808 for use in online control of equipment 800.

The data definition widget 1204 provides options for the user in defining the data and/or algorithms used in generating the plot 1206 and/or in identifying the system model. For example, the data definition widget 1204 includes a start time field 1216 and an end time field 1218. A user may select the start time field 1216 to select a start time of the plot 1206 (i.e., the left-most time on the plot 1206) and the end time field 1218 to select an end time of the plot 1206 (i.e., the right-most point on the plot 1206). The plot 1206 may then be updated to reflect changes to the start time field 1216 and end time field 1218.

The data definition widget 1204 also includes select experiment button 1220. The select experiment button 1220 is selectable to launch an experiments widget that allows a user to select an experiment from a list of available experiments and/or customize other options relating to an experiment (e.g., the size of time steps, a number of time steps, a total duration of an experiment). The The data definition widget 1204 further includes an algorithm options button 1222. The algorithm options button 1222 is selectable to launch an algorithm options widget 1300 shown in FIG. 13 and described in detail with reference thereto.

Referring now to FIG. 13, an algorithm options widget 1300 overlaid on the fit evaluation view 1200 on the user device 804 is shown, according to an exemplary embodiment. The algorithm options widget 1300 provides several options relating to the training data used in generating the system model and the algorithm, process, and/or cost function used to identify the values of the parameters. Various options are possible in various embodiments. In the embodiment shown, the algorithm options widget 1300 includes a filter toggle 1302 that allows the user to turn on or off a filter for the training data. A saturation detection toggle 1304 allows the user to turn on or off a saturation detection and removal process, for example a saturation detection and removal process as described in detail in U.S. patent application Ser. No. 15/900,459 filed Feb. 20, 2018, incorporated by reference herein in its entirety. A maximum iterations field 1306 allows a user to determine how many times the set of parameter values $\varphi_n$ are adjusted in attempting to identify the set of parameter values that minimize the cost function (i.e., as described above with reference to FIGS. 8-9).

A cost function drop down menu 1308 allows a user to select a cost function from a set of cost functions, for example a prediction error method from a set of prediction error methods. For example, the cost function drop down menu 1308 may allow the user to select one of the one-step ahead prediction error method, the simulation prediction error method, or the multi-step ahead predication error method described in U.S. patent application Ser. No. 15/953,324, filed Apr. 13, 2018, incorporated by reference in its entirety herein. As shown in FIG. 13, the multistep prediction error method is selected. In response, the algorithm options widget 1300 provides additional options specific to the multistep prediction error method, including a horizon field 1310 and a weights field 1312. The horizon field 1310 allows the user to select the horizon for the multistep prediction error method, i.e., the number of steps ahead for which the prediction error is incorporated into the cost function. The weights field 1312 allows the user to input a weighting function that defines the relative importance of each of the multiple steps ahead in the cost function of the multistep prediction error method.

The graphical user interface 1000 of FIGS. 10-13 thereby provides a user-friendly interface for defining and editing model parameters, editing options relating to the system identification process and the training data, and view and evaluate the fit of the identified system model to real system behavior.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system comprising:
building equipment operable to affect a variable state or condition of a building; and
a control system configured to:
receive a user input indicating a model form, the model form comprising a plurality of matrices having a plurality of matrix elements, wherein the user input comprises entry of a plurality algebraic parameters and one or more arithmetic operations for one or more of the plurality of matrix elements such that the user input defines one or more of the plurality of matrix elements in terms of the plurality of algebraic parameters and the one or more arithmetic operations;
convert the model form indicated by the user input into a sequence of machine-executable steps that, when executed, determines a value of each of the plurality of matrix elements based on a set of potential parameter values;
identify a system model by executing the sequence of machine-executable steps to generate a set of parameter values for the plurality of algebraic parameters by:
calculating a cost function value for each a plurality of sets of potential parameter values using the sequence of machine-executable steps, the cost function value calculated based on training data relating to the building equipment; and
defining the set of parameter values by selecting the set of potential parameter values corresponding to a lowest cost function value;
generate a graphical user interface that illustrates a fit between predictions of the identified system model and behavior of the variable state or condition of the building; and
control the building equipment using the identified system model.

2. The building management system of claim 1, wherein:
the graphical user interface is configured to allow a user to select a cost function from a group of possible cost functions; and
the control system is configured to calculate the cost function value using the cost function.

3. The building management system of claim 1, wherein:
the graphical user interface is configured to allow a user to enter a preference relating to the training data; and
the control system is configured to modify the training data based on the preference.

4. The building management system of claim 1, wherein:
the graphical user interface is configured to allow a user to edit the model form to create an edited model form; and
the control system is configured to update the system model based on the edited model form.

5. The building management system of claim 1, wherein the user input indicating the model form comprises:
a plurality of entries in a plurality of element entry fields, each element entry field corresponding to one of the plurality of matrix elements and configured to receive the plurality of algebraic parameters and the one or more arithmetic operations to allow the user to define one or more of the plurality of matrix elements in terms of the plurality of parameters and the one or more arithmetic operations.

6. The building management system of claim 1, wherein the control system is configured to control the building equipment using the identified system model by generating a control signal for the building equipment by applying the identified system model in a model predictive control approach.

7. The building management system of claim 1, wherein the graphical user interface illustrates the fit between predictions of the identified system model and behavior of the variable state or condition of the building by providing a plot of average prediction errors for a plurality steps into a future, a plot of weighted averages of prediction errors within a prediction horizon for each point of a training set, or a plot of the predictions of the system model overlaid on a plot of the behavior of the variable state or condition of the building.

8. The building management system of claim 1, wherein the building equipment comprises one or more of HVAC equipment, a variable refrigerant flow system, or an energy storage system.

9. The building management system of claim 1, the control system is configured to identify the system model by calculating the value of each of the plurality of matrix elements using the set of parameter values and the sequence of machine-executable steps.

10. A method for controlling building equipment in a building management system, the method comprising:
operating building equipment to affect a variable state or condition of the building;
receiving, by a control system, a user input indicating a model form, the model form comprising a plurality of matrices having a plurality of matrix elements, wherein the user input comprises entry of a plurality of algebraic parameters and one or more arithmetic operations for one or more of the plurality of matrix elements such that the user input defines one or more of the plurality of matrix elements in terms of the plurality of algebraic parameters and the one or more arithmetic operations;
converting, by the control system, the model form into a sequence of machine-executable steps that, when executed, determines a value of each of the plurality of elements based on a set of potential parameter values;
identifying a system model by generating a set of parameter values for the plurality of algebraic parameters, wherein generating the set of parameter values comprises:
calculating a cost function value for each a plurality of sets of potential parameter values by executing the sequence of machine-executable steps, the cost-function value calculated based on training data relating to the building equipment; and
defining the set of parameter values by selecting the set of potential parameter values corresponding to a lowest cost function value;
generating a graphical user interface that illustrates a fit between predictions of the identified system model and behavior of the variable state or condition of the building; and
controlling the building equipment using the identified system model.

11. The method of claim 10, wherein the graphical user interface allows a user to select a cost function from a group of possible cost functions, the cost function value calculated based on the cost function.

12. The method of claim 10, wherein:
the graphical user interface allows a user to enter a preference relating to the training data; and
the method comprises modifying the training data based on the preference.

13. The method of claim 10, wherein:
the graphical user interface allows a user to edit the model form to create an edited model form; and
the method comprises updating, by the control system, the identified system model based on the edited model form.

14. The method of claim 10, wherein the user input indicating the model form comprises:
a plurality of entries in a plurality of element entry fields, each element entry field corresponding to one of the plurality of matrix elements and configured to receive the plurality of algebraic parameters and the arithmetic operations to allow the user to define a corresponding matrix element in terms of one or more of the plurality of algebraic parameters and one or more of the arithmetic operations; and
an indication of one or more of a number of inputs, a number of outputs, or a number of states of the model form.

15. The method of claim 10, wherein controlling the building equipment using the identified system model comprises generating a control signal for the building equipment by applying the identified system model in a model predictive control approach.

16. The method of claim 10, wherein the graphical user interface illustrates the fit between predictions of the identified system model and behavior of the variable state or condition of the building by providing a plot of average prediction errors for a plurality steps into a future, a plot of weighted averages of prediction errors within a prediction horizon for each point of a training set, or a plot of the predictions of the system model overlaid on a plot of the behavior of the variable state or condition of the building.

17. The method of claim 10, wherein the building equipment comprises one or more of HVAC equipment, a variable refrigerant flow system, or an energy storage system.

* * * * *